US012292523B2

(12) United States Patent
Boettger et al.

(10) Patent No.: US 12,292,523 B2
(45) Date of Patent: May 6, 2025

(54) SYSTEMS, METHODS, AND DEVICES FOR OPTIMIZED RETURN TO HPLMN

(71) Applicant: Apple Inc., Cupertino, CA (US)

(72) Inventors: David Boettger, San Jose, CA (US); Jose A Castelo Vega, San Jose, CA (US); Ozgur Ekici, Ottawa (CA)

(73) Assignee: Apple Inc., Cupertino, CA (US)

( * ) Notice: Subject to any disclaimer, the term of this patent is extended or adjusted under 35 U.S.C. 154(b) by 406 days.

(21) Appl. No.: 17/844,269

(22) Filed: Jun. 20, 2022

(65) Prior Publication Data

US 2023/0408626 A1 Dec. 21, 2023

(51) Int. Cl.

*H04W 8/02* (2009.01)
*G01S 5/00* (2006.01)
*H04W 64/00* (2009.01)
*H04W 84/04* (2009.01)

(52) U.S. Cl.

CPC ............. *G01S 5/0054* (2013.01); *H04W 8/02* (2013.01); *H04W 64/00* (2013.01); *H04W 84/042* (2013.01)

(58) Field of Classification Search

CPC ..................................................... G01S 5/0054
USPC ....................................................... 455/456.1
See application file for complete search history.

(56) References Cited

U.S. PATENT DOCUMENTS 9,609,620 B1 * 3/2017 Bitra ..................... H04W 64/00
2015/0382286 A1 12/2015 Daoud
2019/0159101 A1 * 5/2019 Yu ......................... H04W 48/18
2021/0185508 A1 6/2021 Buckley et al.
2021/0321326 A1 * 10/2021 Balasubramanian ........................ H04W 48/20
2021/0337457 A1 10/2021 Jun et al.

* cited by examiner

*Primary Examiner* — Qutbuddin Ghulamali
(74) *Attorney, Agent, or Firm* — Eschweiler & Potashnik, LLC; Ningjiao Zhang

(57) ABSTRACT

The techniques described herein include superior home-on-home roaming procedures by enabling user equipment (UE) to modify a home public land mobile network (HPLMN) search periodicity based on a likelihood of detecting an HPLMN cell (e.g., base station). A UE may be configured to determine a current geographic location of the UE, access a database that includes information about the HPLMN for the location (e.g., prior HPLMN searches), determine an appropriate HPLMN search periodicity based on the information, and perform HPLMN searches based on the appropriate HPLMN search periodicity. In some implementations, the UE may determine the HPLMN search periodicity based on a number (N) of HPLMN cells, and/or times an HPLMN cell sample, associated with the geographic area, has been detected previously.

20 Claims, 15 Drawing Sheets

600

610

| N_VARIABLE (NUMBER OF CELLS) | VALUE (THRESHOLD QUANTITY) |
|---|---|
| N_LARGE (THRESHOLD) | 20 |
| N_SMALL (THRESHOLD) | 1 |
| N_NONE (THRESHOLD) | 0 |

620

| T_VARIABLE (TIME) | VALUE (MINUTES) |
|---|---|
| T_SMALL | 1 |
| T_MEDIUM | 10 |
| T_LARGE | 120 |

*FIG. 6*

SYSTEMS, METHODS, AND DEVICES FOR OPTIMIZED RETURN TO HPLMN

FIELD

This disclosure relates to wireless communication networks including techniques for communicating with different wireless communication networks.

BACKGROUND

Wireless communication networks and wireless communication services are becoming increasingly dynamic, complex, and ubiquitous. For example, some wireless communication networks may be developed to implement fifth generation (5G) or new radio (NR) technology, sixth generation (6G) technology, and so on. Such technology often includes procedures for enabling user equipment (UEs) to move between wireless communication networks.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

FIG. 6 is a diagram of example data structures for determining an HPLMN search time (T) based on cell information according to one or more implementations described herein.

DETAILED DESCRIPTION

Figure 1:
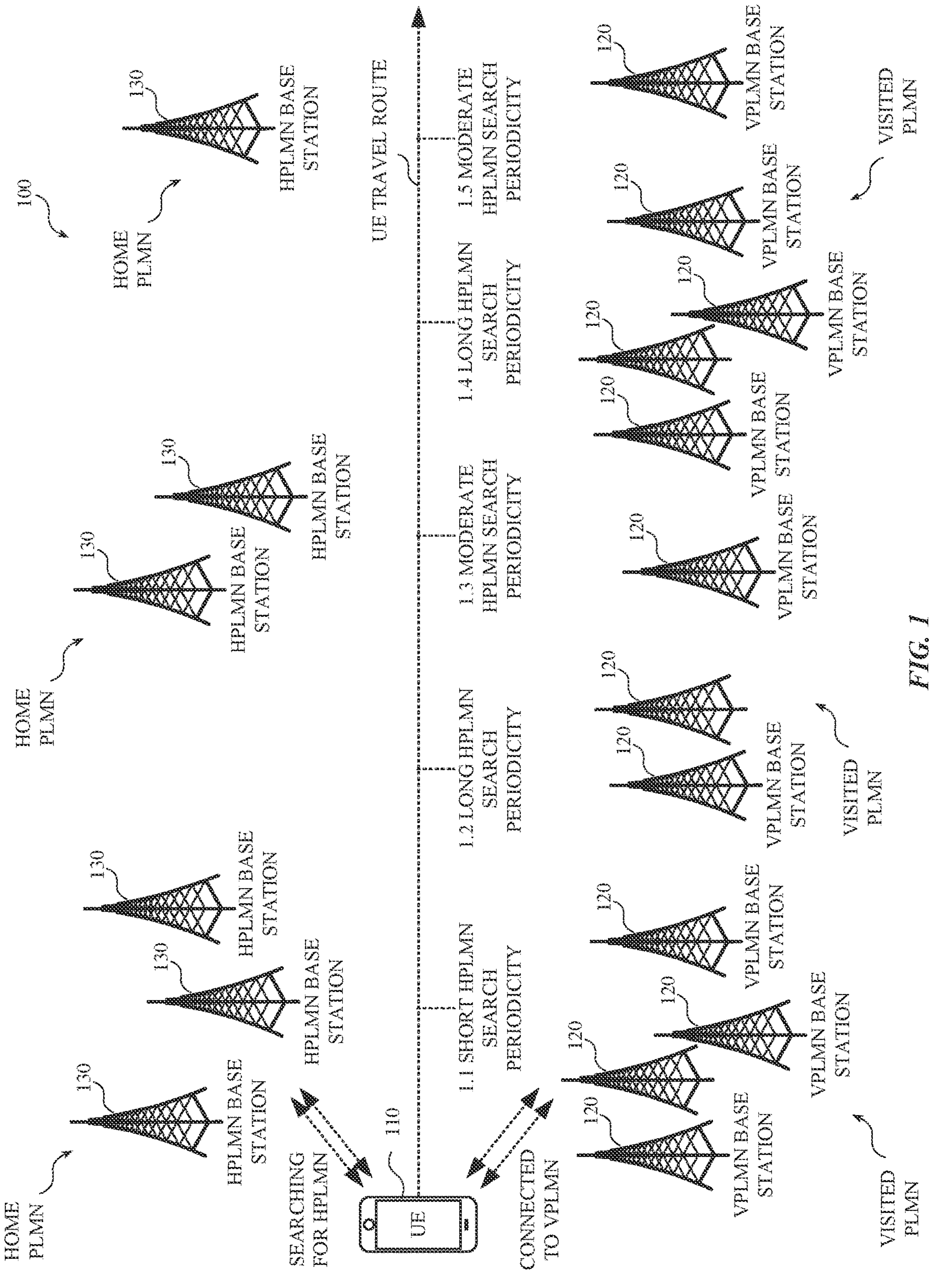
FIG. 1 is a diagram of an example overview according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Challenges for a new wireless network service provider to enter a market that already includes established service providers can be significant. A priority for the new provider may be to build out network coverage, as consumers may have grown used to ubiquitous cellular service. But building out network coverage can take significant time, money, and other resources. Indeed, depending on the scenario, it may take many years for the new provider to achieve nationwide coverage and deep in-building coverage comparable to established providers.

For newly acquired customers to perceive nationwide, ubiquitous coverage on the new provider's network, the new provider may establish roaming agreements with one or more established providers. With such agreements in-place, the new provider's customers may utilize the new provider's network infrastructure when available, and roam onto an established provider's network when the new provider's network is unavailable. In some scenarios, this may be referred to as "home-on-home" roaming. In such a scenario, the roaming, or established provider's, network may be referred to as a visited public land mobile network (VPLMN); and the home, or new provider's, network may be referred to as a home public land mobile network (HPLMN). Additionally, HPLMN return, optimized HPLMN return, and the like, may include a process or procedure where a user equipment (UE) that is connected to a VPLMN searches for and discovers an HPLMN, and switches, or returns, to the HPLMN. Also, while home-on-home roaming may be helpful for bootstrapping the network operations of new wireless network service provider, it may also present challenges. For example, while home-on-home roaming can be lucrative for the established service provider, it can be correspondingly expensive for the new service provider.

The 3rd generation partnership project (3GPP) specifications, however, are not optimized for fast or efficient return to HPLMN, as the original network design envisioned roaming as being primarily international in nature, rather than home-on-home. Per the 3GPP, the mechanism that allow devices to return from the VPLMN to the HPLMN is a periodic background search (or "HPLMN search"), in which UEs check for the presence of the HPLMN on an infrequent basis (e.g., every 20 minutes). The reason for the low-frequency check may be that periodic background search is expensive from a UE energy consumption perspective, and further that the UE may be unable to access cellular services during the background searches.

There are 3GPP mechanisms that could be leveraged to assist roaming devices with faster return to the HPLMN in a power-efficient way. However, these mechanisms—namely, establishing neighboring relationships between the HPLMN cells and the VPLMN cells suffer from several drawbacks. For example, enabling home-on-home roaming may involve a frequent, if not constant, exchange of technical data and cell site reconfiguration on the part of both the new and established wireless network service providers. Moreover, there can be a disincentive for the established service provider to participate in constant data exchange and network reconfigurations, as the more time the roaming UEs remain on the VPLMN, the more roaming revenue may accrue to the established service provider, which may in turn be averse to the own UEs of the established service provider since the roaming UEs of the HPLMN may give rise to additional network congestion in the VPLMN.

Attempts to expedite home-on-home roaming have involved a reduction in the periodicity of the background search for the HPLMN performed by a roaming UE (e.g., from 20 minutes to just a few minutes). However, this is not a satisfying solution for the new service provider, or for the new provider's customers, regardless of the background search period chosen. For example, if the search period is set statically, it cannot be optimal since in some areas of a VPLMN a UE may have greater chances than in other areas of discovering a HPLMN. Indeed, in areas where no new entrant infrastructure exists at all, frequent HPLMN searches are purely a waste of UE battery power since they are certain to fail. And in areas where new provider cells are readily available, infrequent background searches may mean that user traffic is unnecessarily routed to the VPLMN, thereby draining the financial resources of the new provider and increasing the congestion in the VPLMN. In other words, currently available procedures for home-on-home roaming fail to provide adequate solutions by often involving too much batter power usage or too infrequent HPLMN searches.

The techniques described herein include superior home-on-home roaming procedures by enabling UEs to modify HPLMN search periodicity based on a likelihood of successfully detecting a HPLMN cell (e.g., base station). For example, a UE may be configured to determine a current geographic location of the UE, access a database that includes information about the HPLMN for the location (e.g., prior HPLMN searches), determine an appropriate HPLMN search periodicity based on the information, and perform HPLMN searches based on the appropriate HPLMN search periodicity. In some implementations, the UE may determine the HPLMN search periodicity based on a number (N) of HPLMN cells, and/or times an HPLMN cell sample, associated with the geographic area, has been detected previously.

HPLMN search periodicity may be referred to herein as search time (T), HPLMN search time, and the like. In some implementations, the UE may determine the HPLMN search periodicity based on one or more of N or T default values, which UE may modify based on factors, such as the type of HPLMN cells associated with the area, whether the UE is moving or stationary, etc. Accordingly, the techniques described herein include several optimization-oriented solutions to enabling a UE to perform HPLMN searches in a manner that optimizes search frequency and battery power conservation, and in so doing, may help address significant pragmatic issues involved in bootstrapping a wireless network service. Details and examples of these techniques are described below with reference to the Figures.

Figure 2:
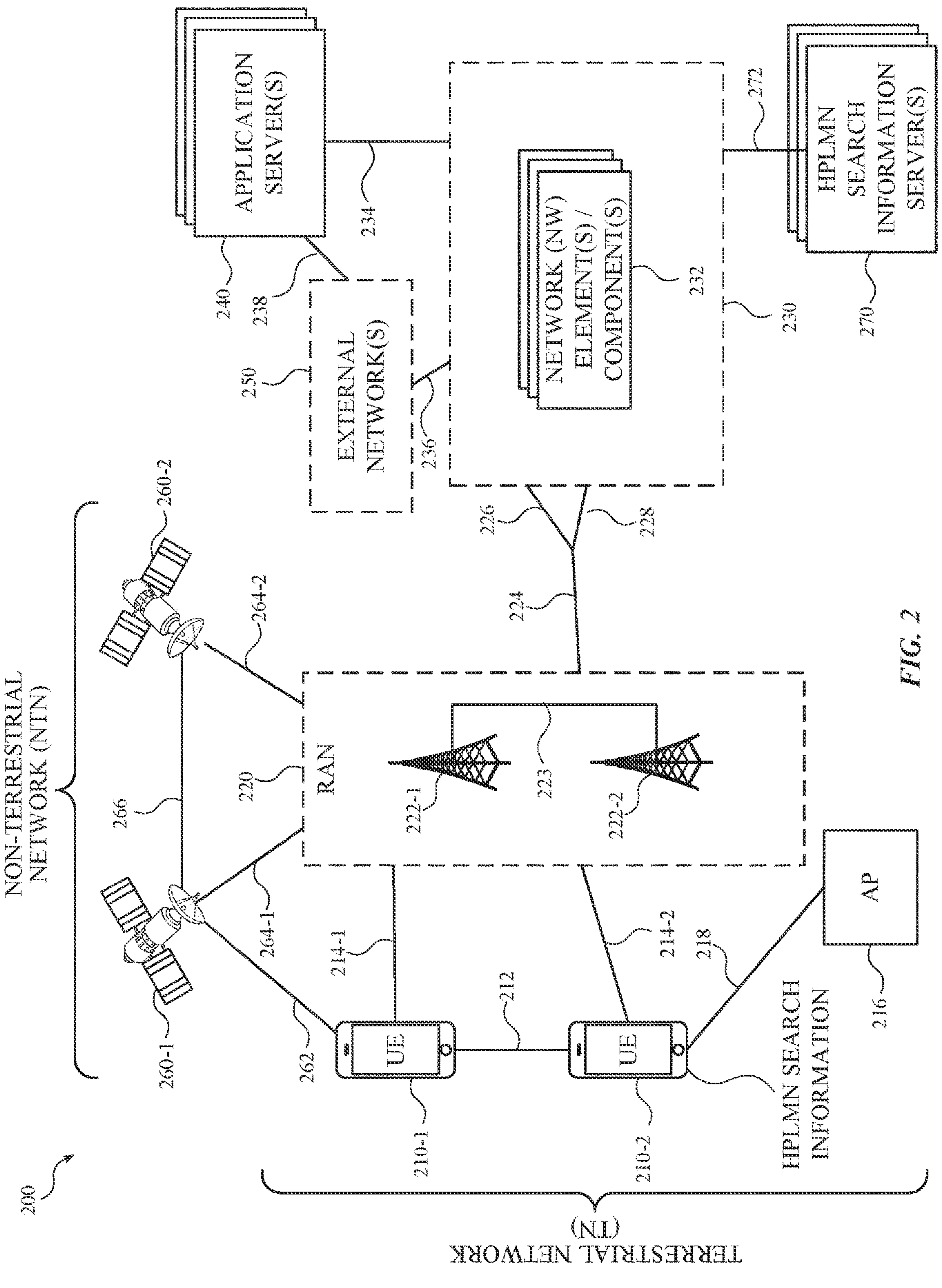
FIG. 2 is a diagram of an example network according to one or more implementations described herein.

FIG. 1 is a diagram of an example overview 100 according to one or more implementations described herein. As shown, overview 100 may include a UE 110 traveling along a route that bifurcates base stations 120 of a visited PLMN (VPLMN) and base stations 130 of a home PLMN (HPLMN). FIG. 2 may provide a more detailed example of a VPLMN and/or HPLMN. While traveling, UE 110 may remain connected to base station 120 of the VPLMN and search for cells from the HPLMN. UE 110 may also modify an HPLMN search periodicity based on a location of the UE. At 1.1, UE 110 may determine, based on information in an HPLMN search database, that a current location of UE 110 is known to have a high probability of discovering HPLMN cells that would enable UE 110 to switch from the VPLMN to the HPLMN. As such, UE 110 may implement a short HPLMN search periodicity to increase the chances of discovering suitable cells for returning to the HPLMN.

At 1.2, UE 110 may determine that the current location of UE 110 is known to have a low probability of discovering suitable HPLMN cells and may therefore switch to a long HPLMN search periodicity to conserve battery power. At 1.3, UE may implement a moderate HPLMN search periodicity upon determining that the UE 110 is in an area known to have a moderate chance of the UE 110 discovering HPLMN cells (e.g., because at 1.3 there are more HPLMN base station 130 than at 1.2 but fewer HPLMN base stations 130 than at 1.3). Since UE 110 may not be near any bases station 130 at 1.4, UE 110 may switch to a long HPLMN search periodicity and revert to a moderate HPLMN search periodicity at location 1.5 because of a nearby HPLMN base station 130. If/when UE 110 discovers an HPLMN cell, UE 110 may proceed by switching (or returning) to the HPLMN. As such, the techniques described herein include solutions for optimizing the transition of UE 110 from a PLMN base station 120 to an HPLMN base station 130 by shortening an HPLMN search periodicity when HPLMN discovery is more likely and lengthening the HPLMN search periodicity is less likely.

As described in additional detail with reference to the following Figures, the techniques described herein may also, or alternatively include one or more additional innovative features, which may include determining a HPLMN search timer (T) based on a number (N), which may represent a number of HPLMN cells detected by previous UEs in a similar location and/or a number (N) of times one or more HPLMN cells have been detected in a similar location. Additional examples of features described in detail below include solutions for determining default T values and modifying default T values and determining default N values and modifying default N values. Further examples, include determining HPLMN search timer (T) based on whether a UE is mobile or stationary, the types of HPLMN cell known to be detectable in a particular area, and more.

FIG. 2 is an example network 200 according to one or more implementations described herein. Example network 200 may include UEs 210-1, 210-2, etc. (referred to collectively as "UEs 210" and individually as "UE 210"), a radio access network (RAN) 220, a core network (CN) 230, application servers 240, external networks 250, and satellites 260-1, 260-2, etc. (referred to collectively as "satellites 260" and individually as "satellite 260"). As shown, network 200 may include a non-terrestrial network (NTN) comprising one or more satellites 260 (e.g., of a global navigation satellite system (GNSS)) in communication with UEs 210 and RAN 220.

The systems and devices of example network 200 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 200 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 210 may include smartphones (e.g., handheld touchscreen mobile computing devices connectable to one or more wireless communication networks). Additionally, or alternatively, UEs 210 may include other types of mobile or non-mobile computing devices capable of wireless communications, such as personal data assistants (PDAs), pagers, laptop computers, desktop computers, wireless handsets, etc. In some implementations, UEs 210 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 210 may communicate and establish a connection with one or more other UEs 210 via one or more wireless channels 212, each of which may comprise a physical communications interface/layer. The connection may include an M2M connection, MTC connection, D2D connection, etc. In some implementations, UEs 210 may be configured to discover one another, negotiate wireless resources between one another, and establish connections between one another, without intervention or communications involving RAN node 222 or another type of network node. In some implementations, discovery, authentication, resource negotiation, registration, etc., may involve communications with RAN node 222 or another type of network node.

UEs 210 may communicate and establish a connection with (e.g., be communicatively coupled) with RAN 220, which may involve one or more wireless channels 214-1 and 214-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 222-1 and 222-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 230. Additionally, at least one of the MN or the SN may be operated with shared spectrum channel access, and functions specified for UE 210 can be used for an integrated access and backhaul mobile termination (IAB-MT). Similar for UE 201, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 222.

As shown, UE 210 may also, or alternatively, connect to access point (AP) 216 via connection interface 218, which may include an air interface enabling UE 210 to communicatively couple with AP 216. AP 216 may comprise a wireless local area network (WLAN), WLAN node, WLAN termination point, etc. The connection 216 may comprise a local wireless connection, such as a connection consistent with any IEEE 702.11 protocol, and AP 216 may comprise a wireless fidelity (Wi-Fi®) router or other AP. While not explicitly depicted in FIG. 2, AP 216 may be connected to another network (e.g., the Internet) without connecting to RAN 220 or CN 230. In some scenarios, UE 210, RAN 220, and AP 216 may be configured to utilize LTE-WLAN aggregation (LWA) techniques or LTE WLAN radio level integration with IPsec tunnel (LWIP) techniques. LWA may involve UE 210 in RRC_CONNECTED being configured by RAN 220 to utilize radio resources of LTE and WLAN. LWIP may involve UE 210 using WLAN radio resources (e.g., connection interface 218) via IPsec protocol tunneling to authenticate and encrypt packets (e.g., Internet Protocol (IP) packets) communicated via connection interface 218. IPsec tunneling may include encapsulating the entirety of original IP packets and adding a new packet header, thereby protecting the original header of the IP packets.

RAN 220 may include one or more RAN nodes 222-1 and 222-2 (referred to collectively as RAN nodes 222, and individually as RAN node 222) that enable channels 214-1 and 214-2 to be established between UEs 210 and RAN 220. RAN nodes 222 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 222 may include a roadside unit (RSU), a transmission reception point (TRxP or TRP), and one or more other types of ground stations (e.g., terrestrial access points). In some scenarios, RAN node 222 may be a dedicated physical device, such as a macrocell base station, and/or a low power (LP) base station for providing femtocells, picocells or the like having smaller coverage areas, smaller user capacity, or higher bandwidth compared to macrocells. As described below, in some implementations, satellites 260 may operate as bases stations (e.g., RAN nodes 222) with respect to UEs 210. As such, references herein to a base station, RAN node 222, etc., may involve implementations where the base station, RAN node 222, etc., is a terrestrial network node and also to implementation where the base station, RAN node 222, etc., is a non-terrestrial network node (e.g., satellite 260).

Some or all of RAN nodes 222, or portions thereof, may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 222; a media access control (MAC)/physical (PHY) layer split wherein RRC, PDCP, radio link control (RLC), and MAC layers may be operated by the CRAN/vBBUP and the PHY layer may be operated by individual RAN nodes 222; or a "lower PHY" split wherein RRC, PDCP, RLC, MAC layers and upper portions of the PHY layer may be operated by the CRAN/vBBUP and lower portions of the PHY layer may be operated by individual RAN nodes 222. This virtualized framework may allow freed-up processor cores of RAN nodes 222 to perform or execute other virtualized applications.

In some implementations, an individual RAN node 222 may represent individual gNB-distributed units (DUs) connected to a gNB-control unit (CU) via individual F1 or other interfaces. In such implementations, the gNB-DUs may include one or more remote radio heads or radio frequency (RF) front end modules (RFEMs), and the gNB-CU may be operated by a server (not shown) located in RAN 220 or by a server pool (e.g., a group of servers configured to share resources) in a similar manner as the CRAN/vBBUP. Additionally, or alternatively, one or more of RAN nodes 222 may be next generation eNBs (i.e., gNBs) that may provide evolved universal terrestrial radio access (E-UTRA) user plane and control plane protocol terminations toward UEs 210, and that may be connected to a 5G core network (5GC) 230 via an NG interface.

Any of the RAN nodes 222 may terminate an air interface protocol and may be the first point of contact for UEs 210. In some implementations, any of the RAN nodes 222 may fulfill various logical functions for the RAN 220 including, but not limited to, radio network controller (RNC) functions such as radio bearer management, uplink and downlink dynamic radio resource management and data packet scheduling, and mobility management. UEs 210 may be configured to communicate using orthogonal frequency-division multiplexing (OFDM) communication signals with each other or with any of the RAN nodes 222 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 222 to UEs 210, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 222 may be configured to wirelessly communicate with UEs 210, and/or one another, over a licensed medium (also referred to as the "licensed spectrum" and/or the "licensed band"), an unlicensed shared medium (also referred to as the "unlicensed spectrum" and/or the "unlicensed band"), or combination thereof. In an example, a licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 210 and the RAN nodes 222 may operate using licensed assisted access (LAA), eLAA, and/or feLAA mechanisms. In these implementations, UEs 210 and the RAN nodes 222 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 210 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe. To operate in the unlicensed spectrum, UEs 210 and the RAN nodes 222 may also operate using stand-alone unlicensed operation where the UE may be configured with a PCell, in addition to any SCells, in unlicensed spectrum.

The PDSCH may carry user data and higher layer signaling to UEs 210. The physical downlink control channel (PDCCH) may carry information about the transport format and resource allocations related to the PDSCH channel, among other things. The PDCCH may also inform UEs 210 about the transport format, resource allocation, and hybrid automatic repeat request (HARQ) information related to the uplink shared channel. Typically, downlink scheduling (e.g., assigning control and shared channel resource blocks to UE 210-2 within a cell) may be performed at any of the RAN nodes 222 based on channel quality information fed back from any of UEs 210. The downlink resource assignment information may be sent on the PDCCH used for (e.g., assigned to) each of UEs 210.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 222 may be configured to communicate with one another via interface 223. In implementations where the system is an LTE system, interface 223 may be an X2 interface. In NR systems, interface 223 may be an Xn interface. The X2 interface may be defined between two or more RAN nodes 222 (e.g., two or more eNBs/gNBs or a combination thereof) that connect to evolved packet core (EPC) or CN 230, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 210 from an SeNB for user data; information of PDCP PDUs that were not delivered to a UE 210; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 220 may be connected (e.g., communicatively coupled) to CN 230. CN 230 may comprise a plurality of network elements 232, which are configured to offer various data and telecommunications services to customers/subscribers (e.g., users of UEs 210) who are connected to the CN 230 via the RAN 220. In some implementations, CN 230 may include an evolved packet core (EPC), a 5G CN, and/or one or more additional or alternative types of CNs. The components of the CN 230 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 230 may be referred to as a network slice, and a logical instantiation of a portion of the CN 230 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 230, application servers 240, and external networks 250 may be connected to one another via interfaces 234, 236, and 238, which may include IP network interfaces. Application servers 240 may include one or more server devices or network elements (e.g., virtual network functions (VNFs) offering applications that use IP bearer resources with CM 230 (e.g., universal mobile telecommunications system packet services (UMTS PS) domain, LTE PS data services, etc.). Application servers 240 may also, or alternatively, be configured to support one or more communication services (e.g., voice over IP (VoIP sessions, push-to-talk (PTT) sessions, group communication sessions, social networking services, etc.) for UEs 210 via the CN 230. Similarly, external networks 250 may include one or more of a variety of networks, including the Internet, thereby providing the mobile communication network and UEs 210 of the network access to a variety of additional services, information, interconnectivity, and other network features.

As shown, example network 200 may include an NTN that may comprise one or more satellites 260-1 and 260-2 (collectively, "satellites 260"). Satellites 260 may be in communication with UEs 210 via service link or wireless interface 262 and/or RAN 220 via feeder links or wireless interfaces 264 (depicted individually as 264-1 and 264). In some implementations, satellite 260 may operate as a passive or transparent network relay node regarding communications between UE 210 and the terrestrial network (e.g., RAN 220). In some implementations, satellite 260 may operate as an active or regenerative network node such that satellite 260 may operate as a base station to UEs 210 (e.g., as a gNB of RAN 220) regarding communications between UE 210 and RAN 220. In some implementations, satellites 260 may communicate with one another via a direct wireless interface (e.g., 266) or an indirect wireless interface (e.g., via RAN 220 using interfaces 264-1 and 264-2).

Additionally, or alternatively, satellite 260 may include a GEO satellite, LEO satellite, or another type of satellite. Satellite 260 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 260 may operate as bases stations (e.g., RAN nodes 222) with respect to UEs 210. As such, references herein to a base station, RAN node 222, etc., may involve implementations where the base station, RAN node 222, etc., is a terrestrial network node and implementation, where the base station, RAN node 222, etc., is a non-terrestrial network node (e.g., satellite 260). As described herein, UE 210 and base station 222 may communicate with one another, via interface 214, to enable enhanced power saving techniques.

HPLMN search information server 270 may include one or more servers, server devices, or network elements (e.g., VNFs) configured to send, receive, process, and/or store information. HPLMN search information server 270 may communicate with CN via connection or interface 272, which may include IP network interfaces. HPLMN search information server 270 may include, manage, and/or have access to a database (e.g., an HPLMN search database), which may store one or more types of data. As described herein, HPLMN search information server 270 may receive, store, and/or process HPLMN information, which may include records describing instances of UEs 210 detecting HPLMN cells in a given geographic area, while connected or otherwise relative, to a VPLMN, etc. For example, HPLMN search database 270 may receive HPLMN information from UEs 210 in a geographic area (e.g., a city, county, state, providence, country, hemisphere, etc.). As described below, the geographic area may be an arbitrarily defined tile of a grid of tiles.

The HPLMN information may indicate the geographic area, a number of HPLMN and/or VPLMN cells detected by UE 210, how many times an HPLMN and/or VPLMN cell was detected by UE 210 in the geographic area, a cell type (e.g., low frequency or high frequency) for each cell detected, a cell number (e.g., a physical cell ID (PCI)) for each HPLMN or VPLMN cell detected, a mobility status or stationary status of UE 210, an HPLMN search periodicity implemented when the HPLMN cell was detected, a total amount of time involved to detect the HPLMN cell (e.g., how many HPLMN search periodicities were completed), etc. In some implementations, some, or all, of the information stored by HPLMN search database 270 may be from UEs 210.

In some implementations, HPLMN search database 270 may receive some HPLMN information from UEs 210. In some implementations, HPLMN search database 270 may receive HPLMN information from UEs 210 of multiple networks, including HPLMNs and VPLMNs relative to a given UE. HPLMN search database 270 may also be configured to identify and create a record of (e.g., a grid, tile, etc.) as UEs 210 enter new geographical areas not yet mapped by a current set of grids and tiles defined by HPLMN search database 270. In doing so, HPLMN search database 270 may remain current as network infrastructures (e.g., base stations, cells, PLMNs, etc.) grow and change. HPLMN information from UEs 210 may also, or alternatively, receive HPLMN information from another source (e.g., the access network), perform calculations and operations on the HPLMN information to produce additional HPLMN information, and so on. HPLMN search database 270 may also, or alternatively, provide UEs 210 with HPLMN information (e.g., HPLMN information updates). UEs 210 may store the HPLMN information locally for use as described herein. In some implementations, HPLMN search database 270 may send UEs 210 HPLMN information in response to receiving a message, from UE 210 or the network, about UE 210 being in (e.g., entering) a geographic area. In some implementations, HPLMN search database 270 may push HPLMN information to UEs 210 periodically (e.g., based on a schedule) and/or upon detection of a trigger (e.g., a request from the network operator, notification that a new UE 210 is connecting to the network for the first time, etc.). In some implementations, one or more, or all, of the functions and operations of HPLMN search database 270 may be implemented on a different device or set of devices, including a distributed peer-to-peer (P2P) network of UEs 210.

Figure 3:
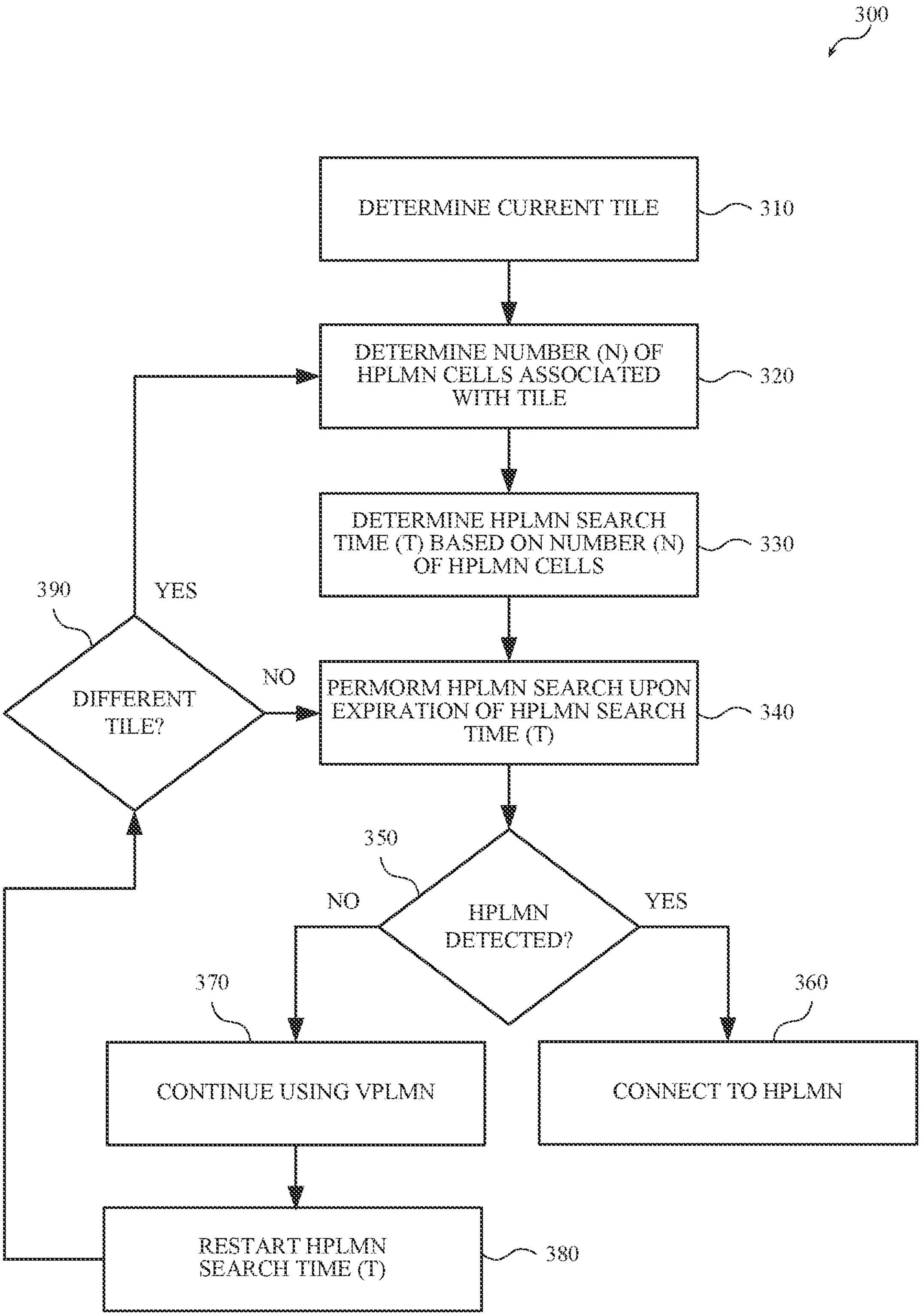
FIG. 3 is a diagram of an example process for optimized home public land mobile network (HPLMN) return according to one or more implementations described herein.

FIG. 3 is a diagram of an example process 300 for optimized HPLMN return according to one or more implementations described herein. Process 300 may be implemented by UE 210. In some implementations, some or all of process 300 may be performed by one or more other systems or devices, including one or more of the devices of FIG. 2, such as base station 222, CN 240, and HPLMN search information server 270. Additionally, process 300 may include one or more fewer, additional, differently ordered and/or arranged operations than those shown in FIG. 3. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIG. 3. Example process 300 is described below with periodic reference to FIGS. 4-6.

As shown, process 300 may include determining a current tile (block 310). For example, UE 210 may determine a tile that is associated with a current location of UE 210. In some implementations, UE 210 may determine the current location based on one or more, or any combination, of geographic coordinates (e.g., GPS information), device or network information of the VPLMN, device or network information of another network (e.g., a WiFi network), etc. Examples of VPLMN information may include one or more, or any combination, of a PLMN code, a mobile country code (MCC) and mobile network code (MNC), a cell global identity (CGI), a location area identity (LAI) and cell identifier (ID), a location area code (LAC), a PCI of a VPLMN cell, a RF channel number of a VPLMN channel, etc.

UE 210 may determine the current location based on positioning data, signal times, etc., received from multiple base station 222 and/or other network nodes (e.g., AP 216, satellite 260, etc.). For example, UE 210 may receive a CGI of a given set of base stations 222 and determine the geographic location and/or the tile to which UE 210 corresponds based on the set of base stations 222 and locally stored mapping data that logically associates different sets of base station 222 signals (possibly at different strengths or distances) to grids and tiles. Additionally, or alternatively, UE 210 may receive GPS data, compare the GPS data to locally stored mapping data that logically associates GPS coordinates to grids and/or tiles. In some implementations, base station 222 of the VPLMN may provide UE 210 with information indicating the tile to which UE 210 corresponds.

Figure 4:
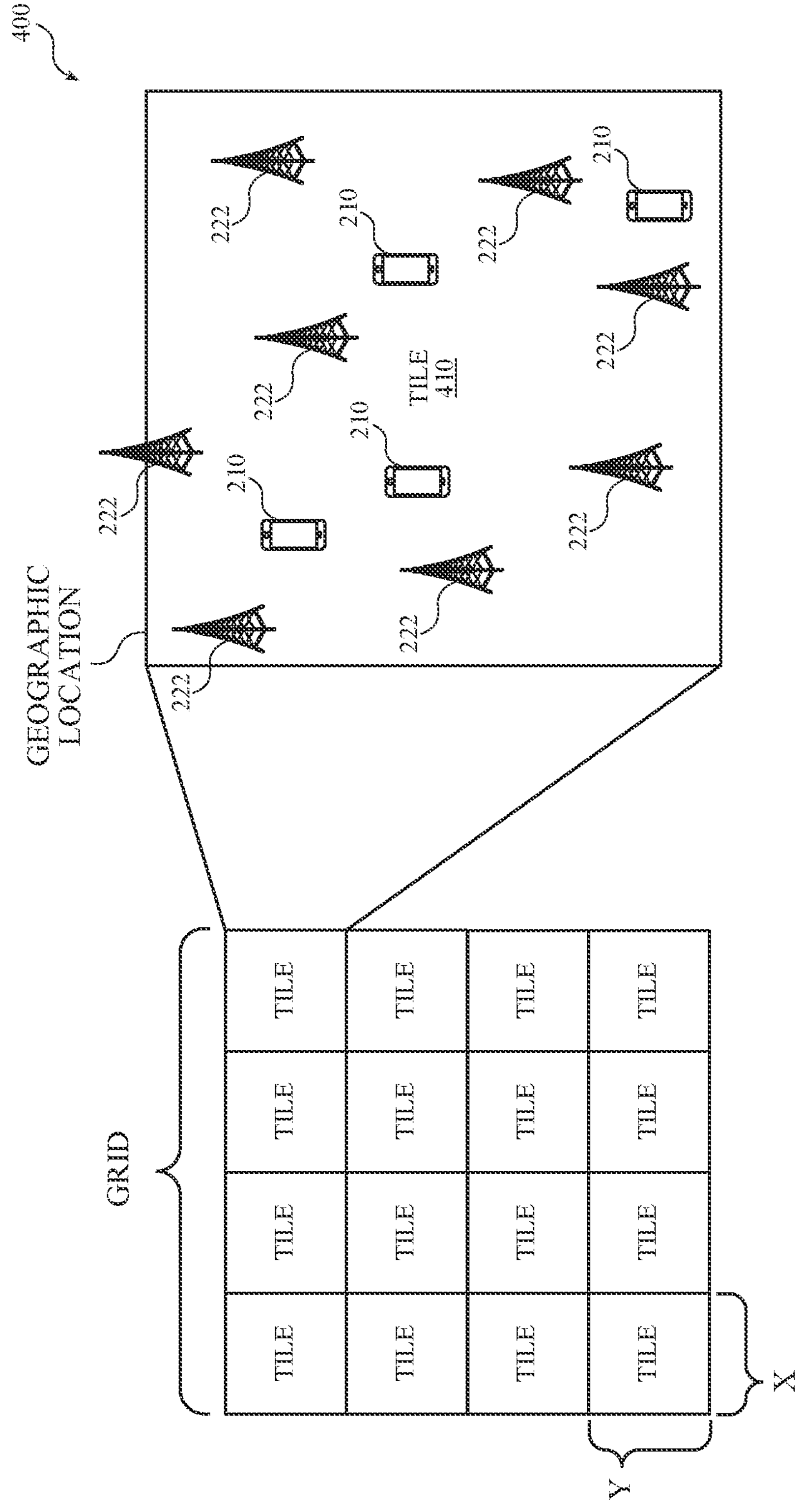
FIG. 4 is a diagram of an example of a grid and tiles according to one or more implementations described herein.

FIG. 4 is a diagram of an example 400 of a grid and tiles according to one or more implementations described herein. As shown, the grid may correspond to a larger geographic area and comprise tiles corresponding to smaller geographic areas. The size and shape of the grid and tiles in FIG. 4 are provided for example purposes only. In some implementations, the size, shape, and relative quantities (e.g., 1-to-16) of a grid and tile may vary. For example, a grid may correspond to a 40×40 kilometer (km) area and may comprise 16 tiles that are each 10×10 km. In another example, a grid may comprise 100×100 km and comprise 2 tiles that are 25×25 km, and 1 tile that is 25×50 km. Additionally, each tile may be associated with one or more PLMN IDs, which may be received by UE 210 upon entering a cell range of one or more base station 222 of a corresponding tile. As discussed, UE 210 may use the PLMN ID of a VPLMN to determine a current tile where the UE 210 is located.

Referring to FIG. 3, process 300 may include determining a number (N) of HPLMN cells associated with a tile (block 320). For example, UE 210 may monitor one or more cells, frequencies, etc., to determine whether UE 210 is able to detect any cells from an HPLMN. In some implementations, this may include UE 210 monitoring a PDSCH cell, a PDCCH, and/or one or more other types of channels for cell information indicative of the HPLMN. Examples of such cell information may include one or more, or any combination, of a PLMN code, an MCC and MNC, a CGI, a LAI and ID, a LAC, a PCI of an HPLMN cell, an RF channel number of an HPLMN channel, etc.

Figure 5:
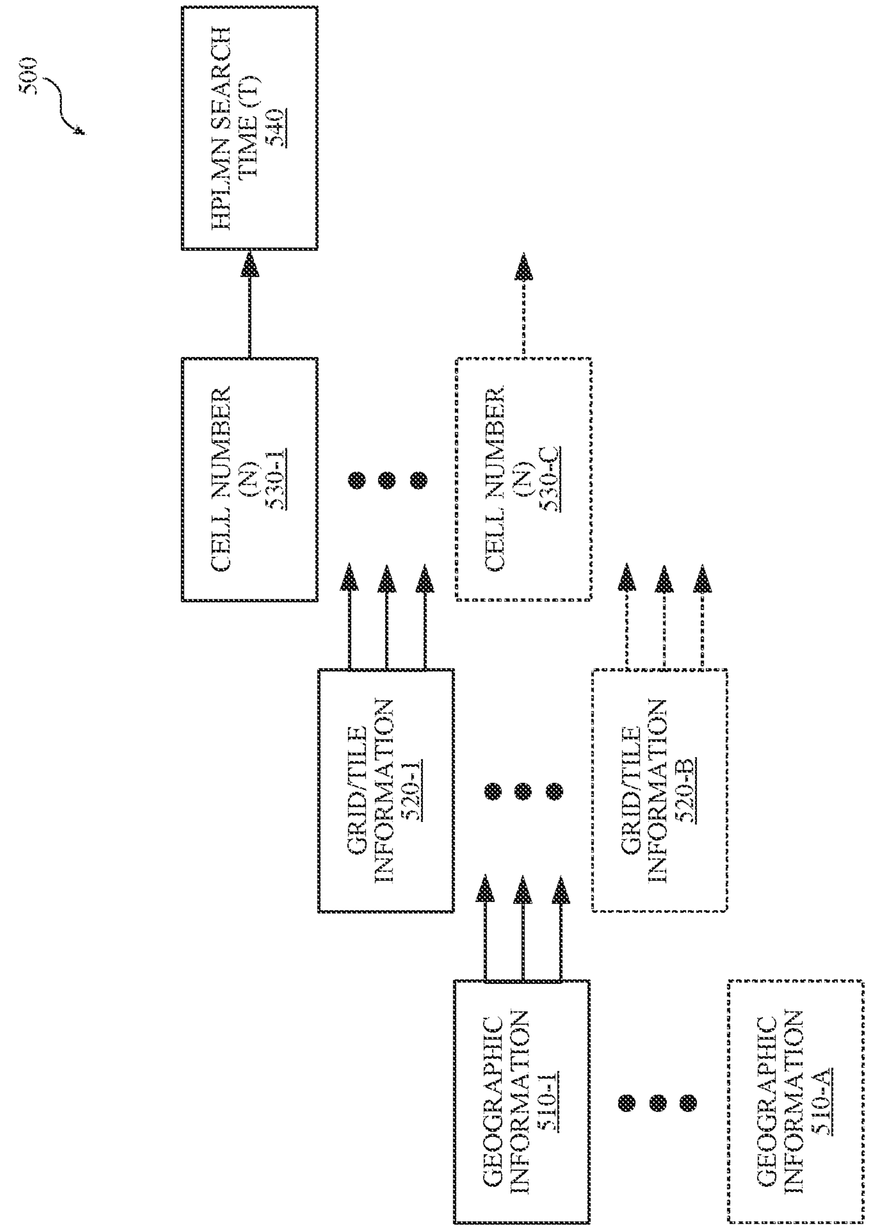
FIG. 5 is a diagram of an example of a data structure for optimized HPLMN return according to one or more implementations described herein.

FIG. 5 is a diagram of example data structures 500 for optimized HPLMN return according to one or more implementations described herein. As shown, data structures 500 may include geographic information 510-1 through 510-A (where A is greater than 1 and collectively referred to as "geographic information 510"), grid/tile information 520-1 through 520-B (where B is greater than 1 and collectively referred to as "grid/tile information 520"), channel number (N) 530-1 through 530-C (where C is greater than 1 and collectively referred to as "cell number (N) 530"), and HPLMN search time (T) 540. Data structures 500 may include example information, including logical associations therebetween, stored by UE 210 and/or HPLMN search information server 270.

For example, UE 210 and/or HPLMN search information server 270 may include multiple instances of geographic information 510 (e.g., GPS coordinates, sets of CGIs, sets of base station signal times, etc.). Each instance of geographic information 510 may be logically associated with grid and/or tile information 520, which may be identified by grid ID, tile ID, and/or another combination of identifying information. Each instance of grid and/or tile information 520 may be logically associated with one or more cell numbers 530. Each cell number 530 may include a number of HPLMN cells hypothetically detectable by UE 210 for a corresponding tile. In some implementations, the cell numbers 530 may be a threshold number of cells (e.g., an "at most" or "at least" number of cells). Additionally, or alternatively, each cell number 530 may be logically associated with an HPLMN search time (T) 540, which may be a duration between which UE 210 is to holdoff on performing searches for HPLMN cells. UE 210 may use one or more of example data structures 500 to determine a number (N) of HPLMN cells associated with a tile (block 320) and/or determine an HPLMN search time based on the number (N) of HPLMN cells (block 330).

Referring to FIG. 3, process 300 may include determining an HPLMN search time (T) based on the number (N) of HPLMN cells (block 330). For example, UE 210 may determine an HPLMN search time (T) based on a number (N) of HPLMN cell detected. In some implementations, UE 210 may do so by accessing locally stored HPLMN search information, which may include logical associations between numbers, or thresholds, of HPLMN cells and different HPLMN search times (T). As such, upon detecting a number of HPLMN cells (which may be 0 or greater) UE 210 may use locally stored HPLMN search information to map the number of HPLMN cells to a corresponding HPLMN search time.

FIG. 6 is a diagram of example data structures 600 for determining an HPLMN search time (T) based on a cell information according to one or more implementations described herein. As shown, data structures 600 may include a first table 610 that includes N variables and corresponding values and a second table 610 that includes T variables and corresponding values. The N variables may represent an actual number or threshold number. As shown, each of N variables may be logically associated with a T variable. In some implementations, UE 210 may use data structures 600 to determine an appropriate HPLMN search time (T) based on a corresponding number or threshold (N) of detected HPLMN cells.

Process 300 may include performing an HPLMN search upon an expiration of the HPLMN search time (T) (block 340). For example, after determining an appropriate HPLMN search time (T), UE 210 may initiate and monitor the HPLMN search time (T). UE 210 may detect expiration of the HPLMN search time (T) and respond by performing a search for HPLMN cells. When an HPLMN is detected (block 350—Yes), process 300 may include connecting to the HPLMN (block 360). For example, UE 210 may connect (or return) to an HPLMN upon detecting one or more HPLMN cells. When an HPLMN is not detected (block 350—No), process 300 may include continuing to use a VPLMN (block 370). For example, UE 210 may be connected to a VPLMN prior to, and during, process 300. Additionally, when UE 210 determines that no HPLMN is detected, UE 210 may continue to use a VPLMN, which may include the UE 210 using the VPLMN to which the UE 210 is connected.

Process 300 may include restarting the HPLMN search time (T) (block 380). For example, UE 210 may restart the HPLMN searcher timer (T) after determining that no HPLMN cells are detected. Process 300 may also, or alternatively, include determining (block 390) whether UE 210 has moved to a different tile. For example, UE 210 may monitor a current geographic location of UE 210 and periodically determine whether UE 210 has entered a different or new tile. When UE 210 has not changed tiles (block 390—No), process 700 may return to monitoring the HPLMN search timer (T) and performing an HPLMN search in response to an expiration thereof. When UE 210 has changed tiles (block 390—Yes), process 700 may include determining a number (N) of HPLMN cells associated with the new tile (block 320). Accordingly, one or more of the techniques described herein may provide solutions for optimizing HPLMN return time and battery power conservation based on whether a current tile of UE 210 is associated with HPLMN cells and/or one or more other types of HPLMN information.

Figure 7:
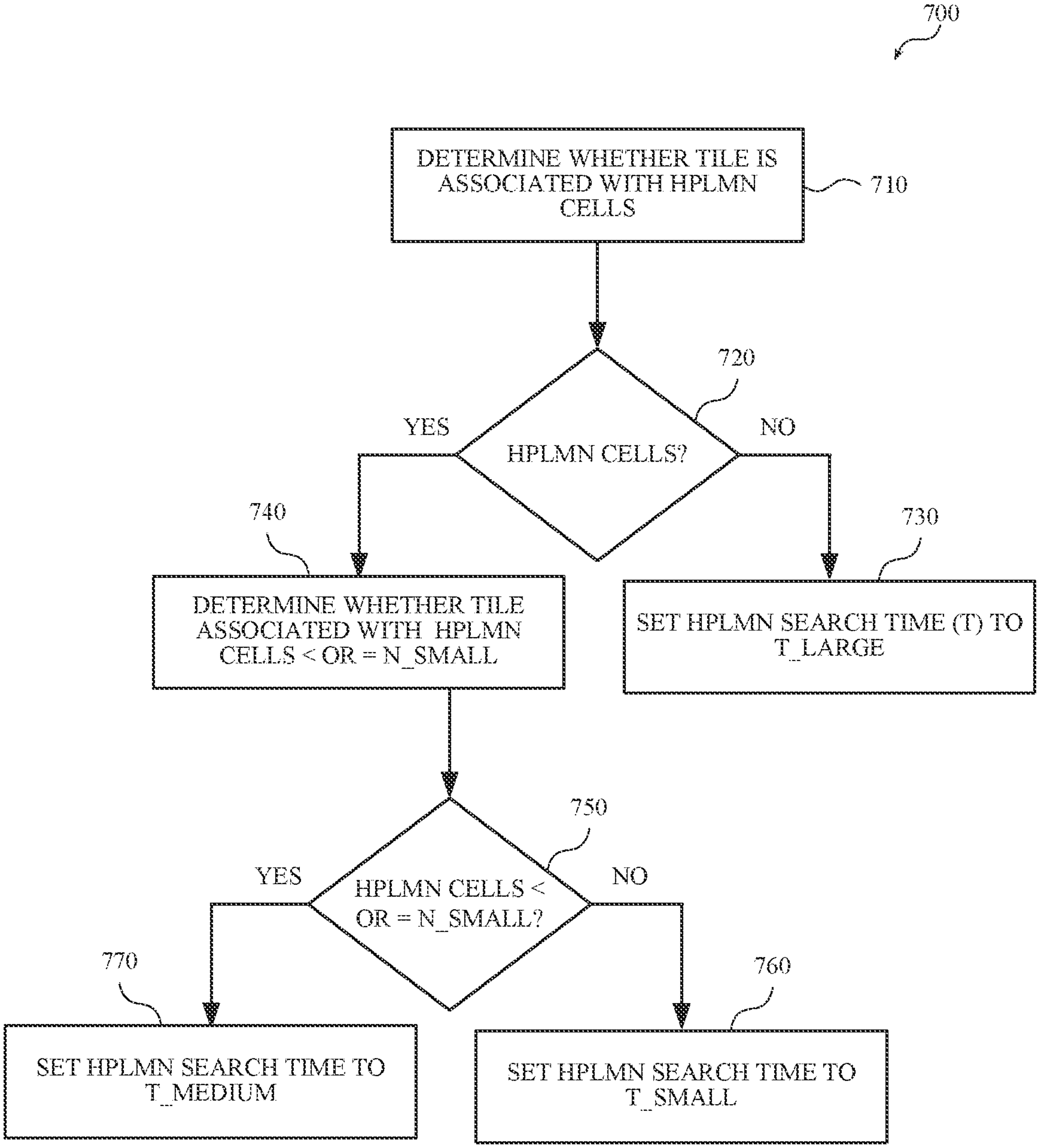
FIG. 7 is a diagram of an example process for optimized HPLMN return based on a number of HPLMN cells according to one or more implementations described herein.

FIG. 7 is a diagram of an example process 700 for optimized HPLMN return based on a number of HPLMN cells according to one or more implementations described herein. Process 700 may be implemented by UE 210. In some implementations, some or all of process 700 may be performed by one or more other systems or devices, including one or more of the devices of FIG. 2, such as base station 222, CN 240, and HPLMN search information server 270. Additionally, process 700 may include one or more fewer, additional, differently ordered and/or arranged operations than those shown in FIG. 7. In some implementations, some or all of the operations of process 700 may be performed independently, successively, simultaneously, etc., of one or more of the other operations of process 700.

As shown, process 700 may include UE 210 determining whether a tile is associated with any HPLMN cells (block 710). As described herein, this may include UE 210 searching, analyzing, or accessing locally stored HPLMN search information to determine whether a current tile of UE 210 is associated with any HPLMN cells and/or one or more other types of HPLMN information. When the tile is not associated with any HPLMN cells (block 720—No), process 700 may include UE 210 setting an HPLMN search time (T) to a value corresponding to a T_large variable (block 730). UE 210 may use the value of T_large as an HPLMN search periodicity duration (e.g., an amount of time between HPLMN searches).

When the tile is associated with HPLMN cells (block 720—Yes), process 700 may include UE 210 determining whether the current tile is associated with a number of HPLMN cells that is equal to, or less than, a value represented by an N_small variable (block 740). When such HPLMN information is not detected (block 750—No), process 700 may include UE 210 setting an HPLMN search time (T) to a value corresponding to a T_small variable (block 760). UE 210 may use the value of T_small as an HPLMN search periodicity duration (e.g., an amount of time between HPLMN searches). When such HPLMN information is detected (block 750— Yes), process 700 may include UE 210 setting an HPLMN search time (T) to a value corresponding to a T_medium variable (block 770). UE 210 may use the value of T_medium as an HPLMN search periodicity duration. Accordingly, one or more of the techniques described herein may include UE 210 determining an appropriate HPLMN search time or periodicity based on a number of HPLMN cells associated with a particular tile.

Figure 8:
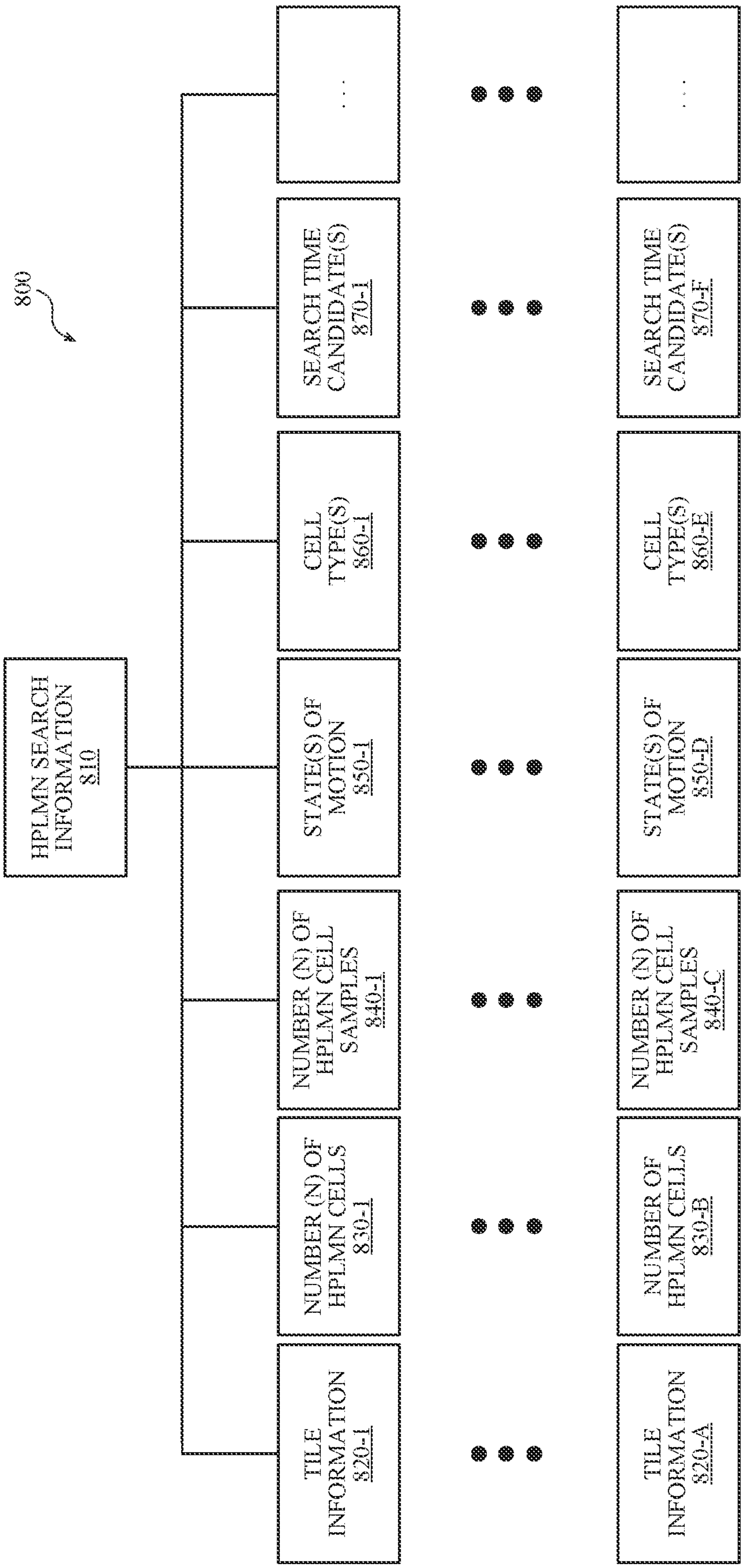
FIG. 8 is a diagram of example data structures for optimized HPLMN return according to one or more implementations described herein.

FIG. 8 is a diagram of example data structures 800 for optimized HPLMN return according to one or more implementations described herein. Data structure 800 may include a broad example of the types of information that may be included in HPLMN search information 810 (also referred to herein as "HPLMN information") as described herein. For example, data structure 800 may include broader example of HPLMN search information arrangements, interrelationships, and logical associations than that described in, for example, FIG. 5.

Additionally, any of data structure 800 may be stored by UE 210 and/or HPLMN search information server 270 to implement one or more of the techniques described herein. In some implementations, data structure 800 may include one or more fewer, additional, differently ordered, and/or arranged types of information than those shown in FIG. 8. For example, in some implementations, some of the types of information of data structure 800 may be communicated, between HPLMN information search server 270 and UE 210 at different times and/or via different messages. Similarly, to implement one or more of the techniques described herein, UE 210 may store and/or use one or more types of information that differs from example data structure 800. As such, data structure 800 is provided as non-limiting example of information that may be used to implement one or more of the techniques described herein.

As shown, data structure 800 may include one or more types of HPLMN search information 810 including tile information 820-1 through 820-A (where A is greater than 1 and collectively referred to as "tile information 820"), and number of HPLMN cells 830-1 through 830-B (where B is greater than 1 and collectively referred to as "number of HPLMN cells 830"). As is further shown, data structure 800 may also include number of HPLMN cell samples 840-1 through 840-C (where C is greater than 1 and collectively referred to as "number of HPLMN cell samples 840"), states of motion 850-1 through 850-D (where D is greater than 1 and collectively referred to as "states of motion 850"), cell types 860-1 through 860-E (where E is greater than 1 and collectively referred to as "cell types 860"), and search time candidates 870-1 through 870-F (where F is greater than 1 and collectively referred to as "search time candidates 870").

Tile information may include geographic coordinates, GPS, network location data, and/or one or more other types of information that define a geographical area. The tile may be associated with a grid, which may include multiple tiles. In some implementations, when UE 210 enters a geographic area that does not correspond to a tile and/or grid, UE 210 may be configured to create information describing the tile and/or grid. Additionally, or alternatively, UE 210 may communicate information describing the tile and/or grid and may communicate the information to the HPLMN cell search information server 270.

Number of HPLMN cells 830 may include a value, representing a number of HPLMN cells, associated with a tile. In some implementations, the number of HPLMN cells may be representative of the quantity of unique HPLMN cells from a cell ID perspective. Additionally, or alternatively, the number of HPLMN cells may be representative of the quantity of unique HPLMN cells from a cell or base station 222 perspective.

Number of HPLMN cell samples 840 may include a value, representing a number of times an HPLMN cell as been sampled within a given period of time (e.g., the last day, week, month, year, ever, etc.). As such, while the number of HPLMN cells 830 may indicate the number of unique HPLMN cells detected in a tile, the number of HPLMN cell samples 840 may include the total number of times that UEs have detected any HPLMN cells in a tile. In other words, a UE 210 detecting the same cell twice may be 2 HPLMN cell samples. In some implementations, a UE 210 may not detect a same cell twice within a pre-selected threshold or prior to a pre-defined event (e.g., UE 210 leaving the tile). One or more implementations regarding HPLMN cell samples are described below with reference to FIG. 9

States of motion 850 may include information describing a speed or velocity of UE 210. In some implementations, state of motion 850 may be limited to either "moving" or "stationary." In some implementations, state of motion 850 may include different threshold velocities, which UE 210 may use to modify one or more N values and/or T values as described herein. In some implementations, states of motion 850 may be captured by UE 210 before, during, or after receiving HPLMN search information. States of motion 850 may be a runtime collection of information by UE 210. Implementations regarding HPLMN cell samples are described below with reference to FIGS. 12-13.

Cell types 860 may include a quality or characteristic of a cell or group of cells. In some implementations, a cell type may be a high frequency cell or a low frequency cell. A high frequency cell may include a cell that uses high frequency, typically greater than 1 GHz. A low frequency cell may include a cell that uses low frequency ranges, typically less than 1 GHz.

Figure 12:
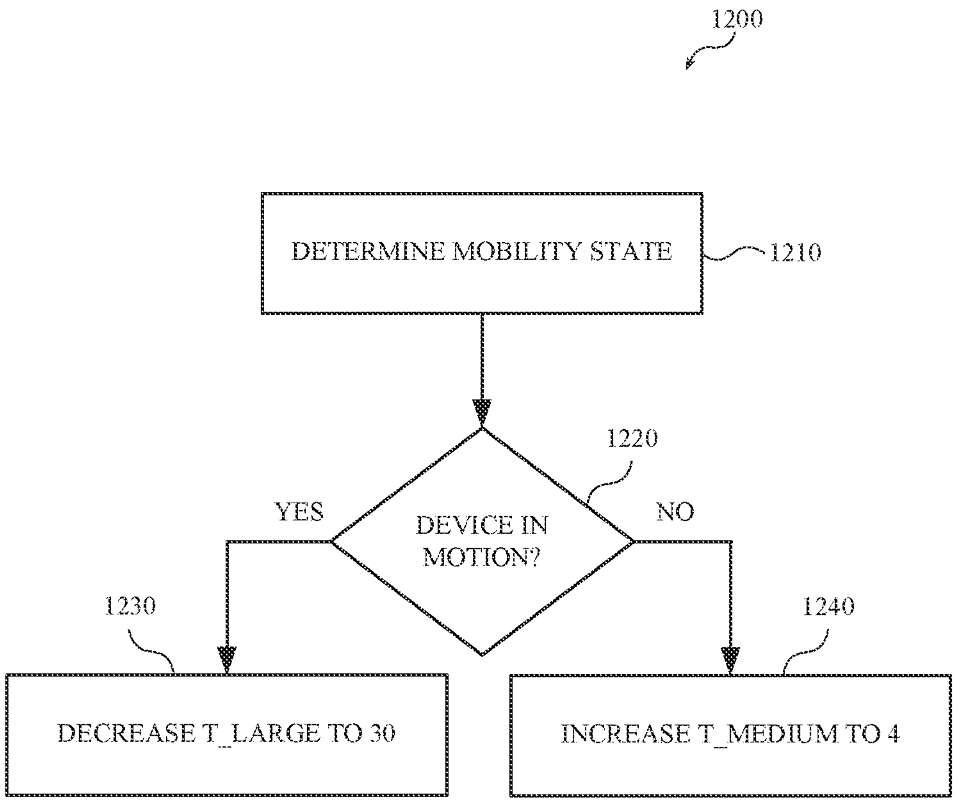
FIG. 12 is a diagram of an example process for modifying T values based on a device mobility state according to one or more implementations described herein.
Figure 13:
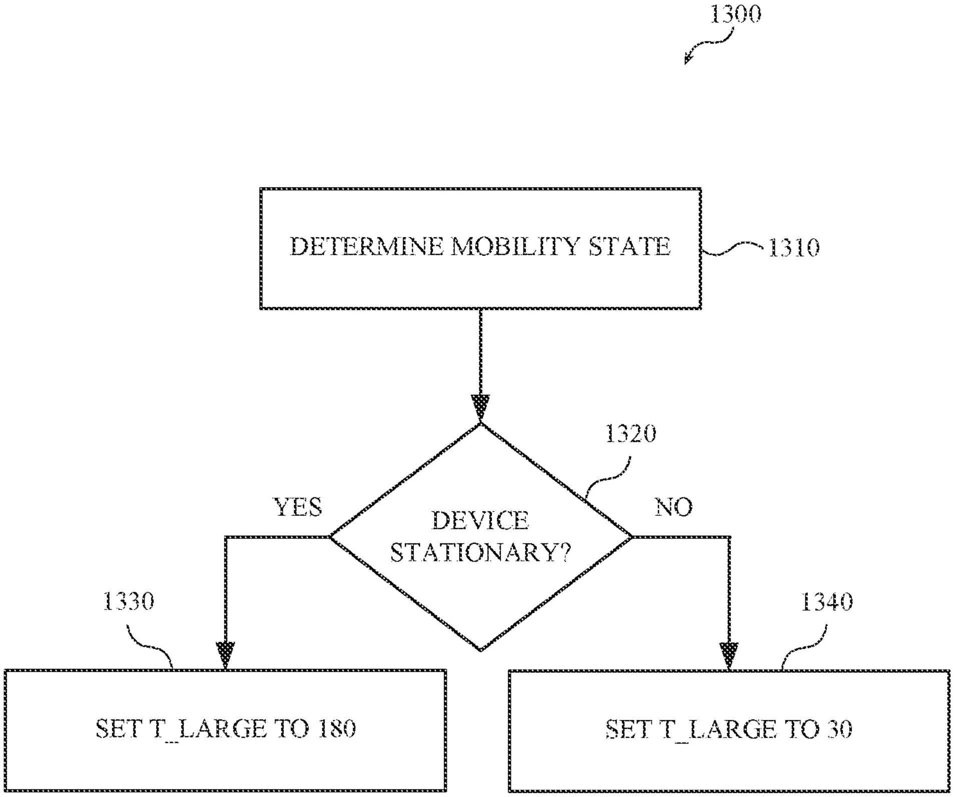
FIG. 13 is a diagram of an example process for modifying T values based on a device mobility state according to one or more implementations described herein.

Search time candidates 870 may include values representing durations of time (T). In some implementations, UE 210 may include variables for time, such as T_short, T_medium, and T_large, such as those shown in FIGS. 6-7, 9, and more. In some implementations, UE 210 may modify the values of Search time candidates 870 based on one or more conditions, such as a state of motion (e.g., mobility state) or stationary status, as shown in FIGS. 12-13.

Figure 9:
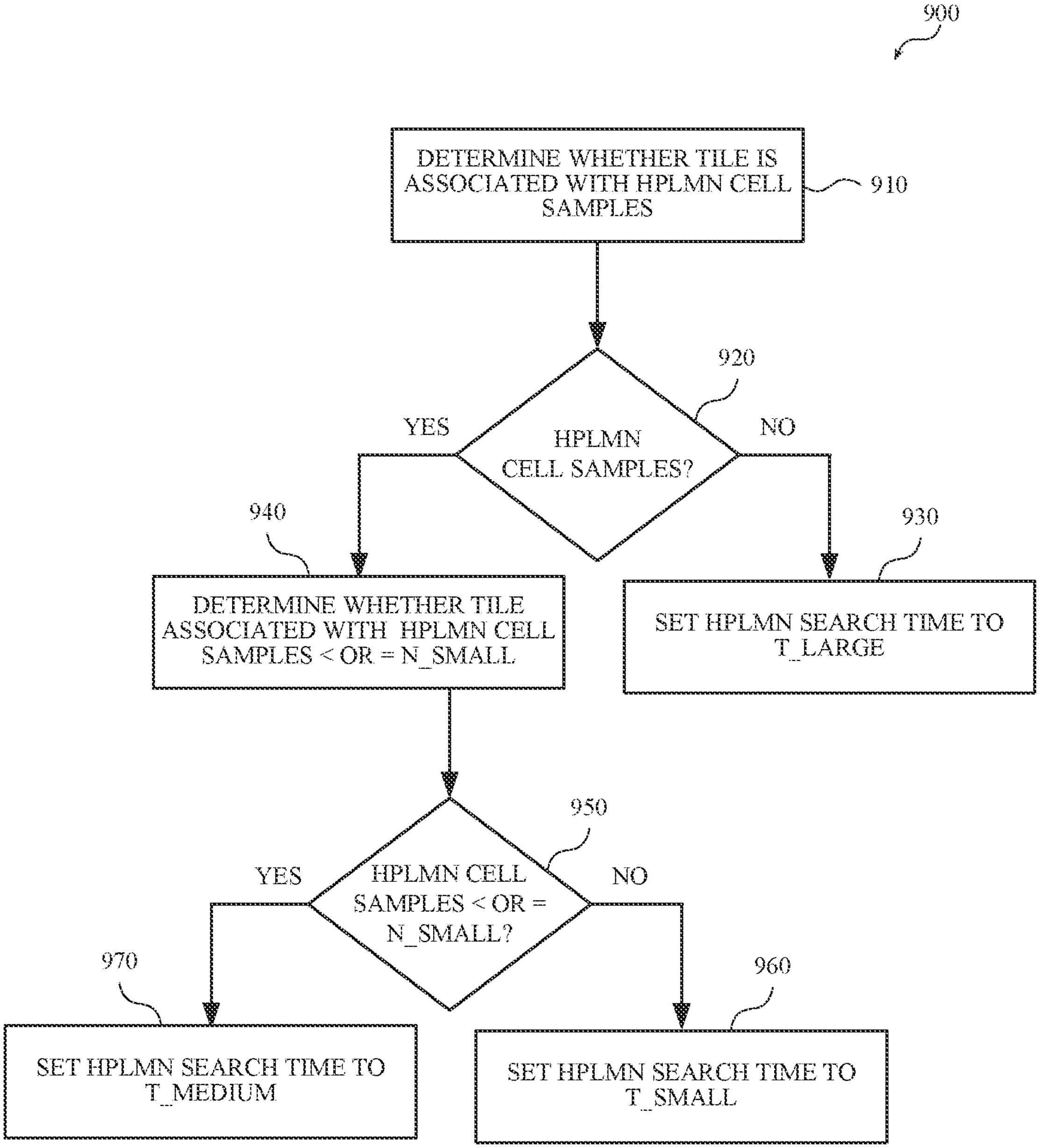
FIG. 9 is a diagram of an example process for optimized HPLMN return based on HPLMN cell samples according to one or more implementations described herein.

FIG. 9 is a diagram of an example process 900 for optimized HPLMN return based on HPLMN cell samples according to one or more implementations described herein. Process 900 may be implemented by UE 210. In some implementations, some or all of process 900 may be performed by one or more other systems or devices, including one or more of the devices of FIG. 2, such as base station 222, CN 240, and HPLMN search information server 270. Additionally, process 900 may include one or more fewer, additional, differently ordered and/or arranged operations than those shown in FIG. 9 In some implementations, some or all of the operations of process 900 may be performed independently, successively, simultaneously, etc., of one or more of the other operations of process 900.

As shown, process 900 may include UE 210 determining whether a tile is associated with any HPLMN cell samples (block 910). As described herein, this may include UE 210 searching, analyzing, or accessing locally stored HPLMN search information to determine whether a current tile of UE 210 is associated with any HPLMN cell samples and/or one or more other types of HPLMN information (also referred to herein as "HPLMN search information"). An HPLMN cell sample, as described herein, may include an instance of a UE 210 (e.g., the same UE 210 or another UE 210) having detected an HPLMN cell (e.g., the same and/or different HPLMN cell) in a given geographic location, tile, etc. When the tile is not associated with any HPLMN cell samples (block 920—No), process 900 may include UE 210 setting an HPLMN search time (T) to a value corresponding to a T_large variable (block 930). UE 210 may use the value of T_large as an HPLMN search periodicity duration (e.g., an amount of time between HPLMN searches).

When the tile is associated with one or more HPLMN cell samples (block 920—Yes), process 900 may include UE 210 determining whether the number of HPLMN cell samples is equal to, or less than, a value represented by an N_small variable (block 940). When such HPLMN information is not detected (block 950—No), process 900 may include UE 210 setting an HPLMN search time (T) to a value corresponding to a T_small variable (block 960). UE 210 may use the value of T_small as an HPLMN search periodicity duration (e.g., an amount of time between HPLMN searches). When such HPLMN information is detected (block 950—Yes), process 900 may include UE 210 setting an HPLMN search time (T) to a value corresponding to a T_mediaum variable (block 970). UE 210 may use the value of T_medium as an HPLMN search periodicity duration. Accordingly, one or more of the techniques described herein may include UE 210 determining an appropriate HPLMN search time or periodicity based on a number of HPLMN cell samples associated with a particular tile.

Figure 10:
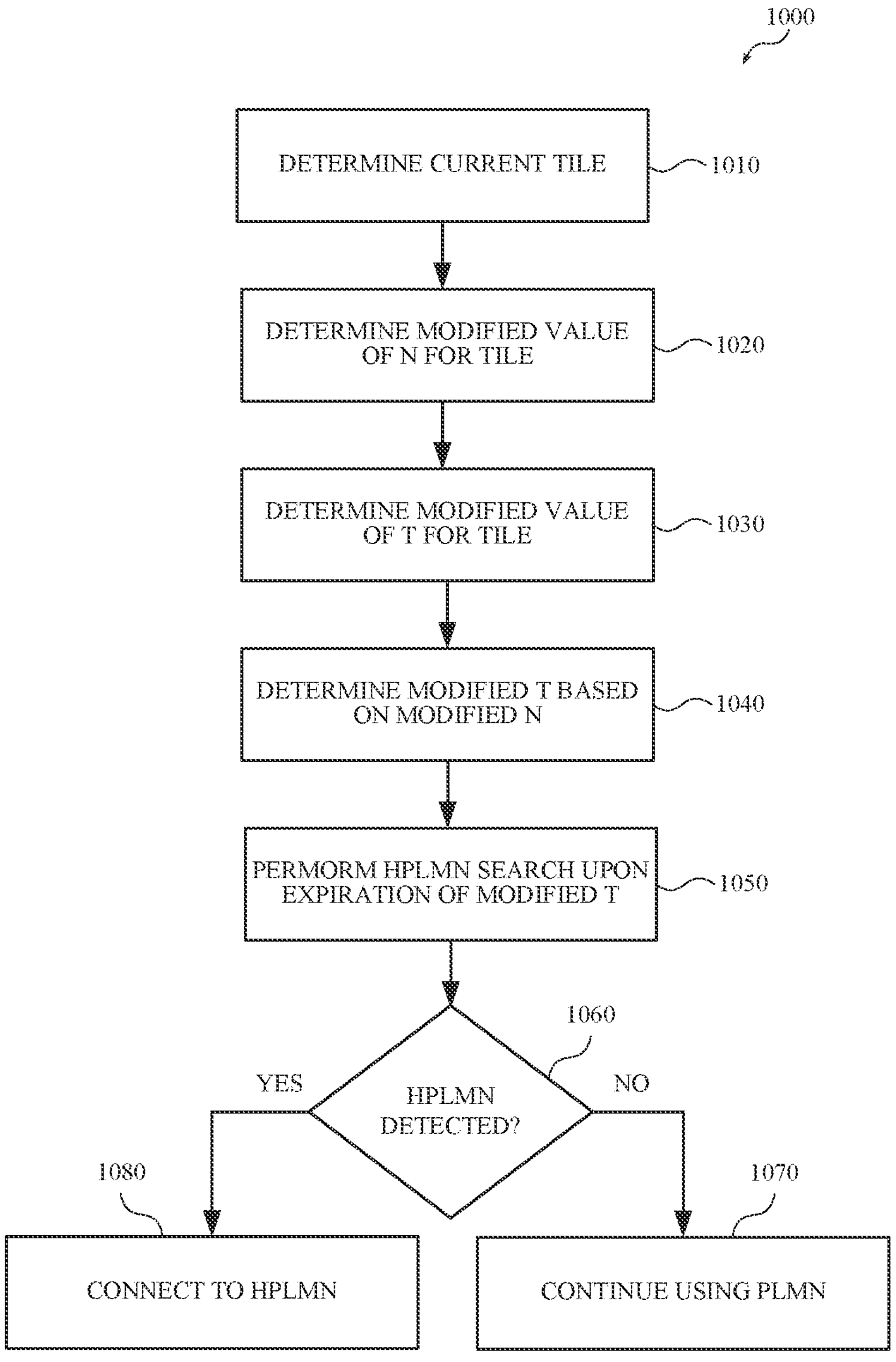
FIG. 10 is a diagram of an example process for optimized HPLMN return based on modified N values and modified T values according to one or more implementations described herein.

FIG. 10 is a diagram of an example process 1000 for optimized HPLMN return based on modified N values and modified T values according to one or more implementations described herein. Process 1000 may be implemented by UE 210. In some implementations, some or all of process 1000 may be performed by one or more other systems or devices, including one or more of the devices of FIG. 2, such as base station 222, CN 240, and HPLMN search information server 270. Additionally, process 1000 may include one or more fewer, additional, differently ordered and/or arranged operations than those shown in FIG. 10. In some implementations, some or all of the operations of process 1000 may be performed independently, successively, simultaneously, etc., of one or more of the other operations of process 1000. The operations of process 1000 are explained below with periodic reference to FIGS. 11-13.

As shown, process 1000 may include determining a current title (block 1010). For example, UE 210 may determine a current title corresponding to a geographic location of UE 210. Process 1000 may include determining a modified value of N for the tile (block 1020). N may be a number of HPLMN cells associated with the tile, a number of instances of HPLMN cells having been detected by UEs 210, etc. UE 210 may modify N based on, for example, a cell type of one or more of the HPLMN cells or HPLMN cell samples.

Figure 11:
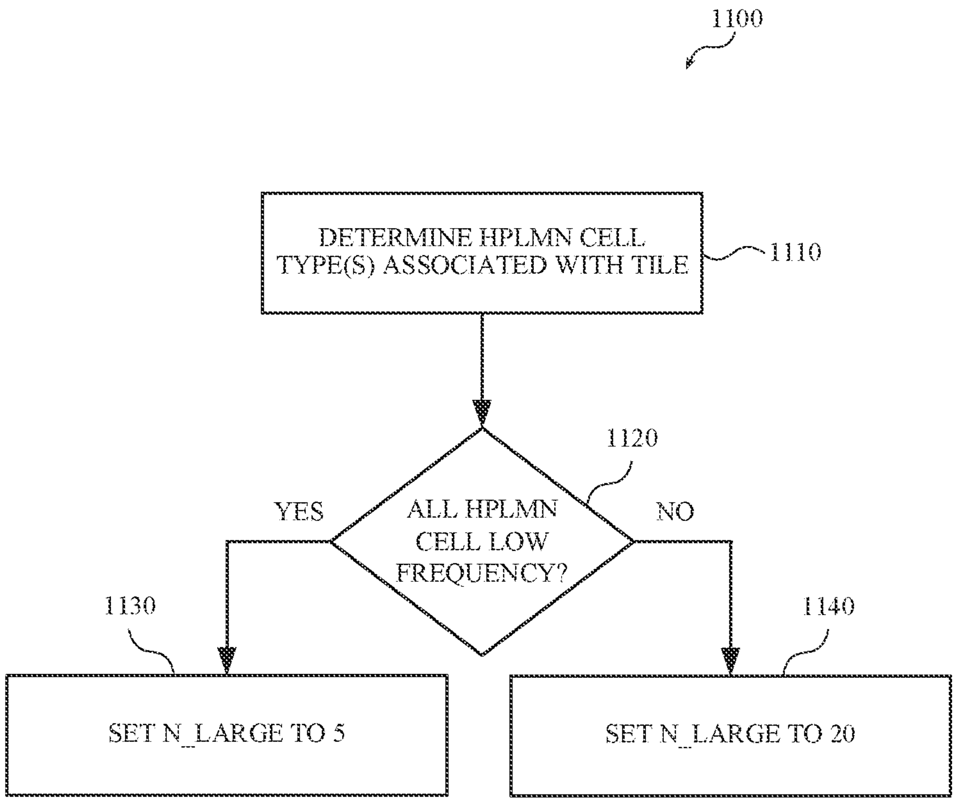
FIG. 11 is a diagram of an example process for modifying N values based on cell frequencies according to one or more implementations described herein.

FIG. 11 is a diagram of an example process 1100 for modifying N values based on cell frequencies according to one or more implementations described herein. Process 1100 may include determining HPLMN cell types associated with a tile (block 1100). For example, UE 210 may determine the cell types (e.g., low frequency cells, high frequency cells, etc.) of cells associated with a tile. When all HPLMN cells are not cells of a low frequency (block 1120—No), process 1100 may proceed by UE 210 setting a value of N_large to 20 (e.g., 20 cells) (block 1140). When all HPLMN cells are cells of a low frequency (block 1120—Yes), process 1100 may include setting N_large to 5 (e.g., 5 cells) (block 1130). As such, UE 210 may modify a value of N for a tile based on a cell type of HPLMN cells associated with the tile.

Referring to FIG. 10, process 1000 may include determining a modified value of T for the tile (block 1030). For example, UE 210 may determine a modified value of T for the tile. In some implementations, UE 210 may determine the modified value of T based on a motion status or mobility state of UE 210. For example, T may be modified based on whether UE 210 is stationary or moving.

FIG. 12 is a diagram of an example process 1200 for modifying T values based on a device mobility state according to one or more implementations described herein. Process 1200 may include UE 210 determining a mobility state of UE 210 (e.g., whether UE 210 is moving at a threshold rate) (block 1210). When UE 210 is not in motion (block 1220 —No), process 1300 may include setting T_medium to 4 minutes (block 1240). By contrast, when UE 210 is in motion (block 1220—Yes), process 1200 may include UE 210 setting T_large to 30 minutes.

FIG. 13 is a diagram of an example process 1300 for modifying T values based on a device mobility state according to one or more implementations described herein. Process 1300 may include UE 210 determining a mobility state of UE 210 (e.g., whether UE 210 is moving at a threshold rate) (block 1310). When UE 210 is not stationary (block 1320 —No), process 1300 may include setting T_large to 30 minutes (block 1340). By contrast, when UE 210 is stationary (block 1320—Yes), process 1300 may include UE 210 setting T_large to 180 minutes.

Figure 14:
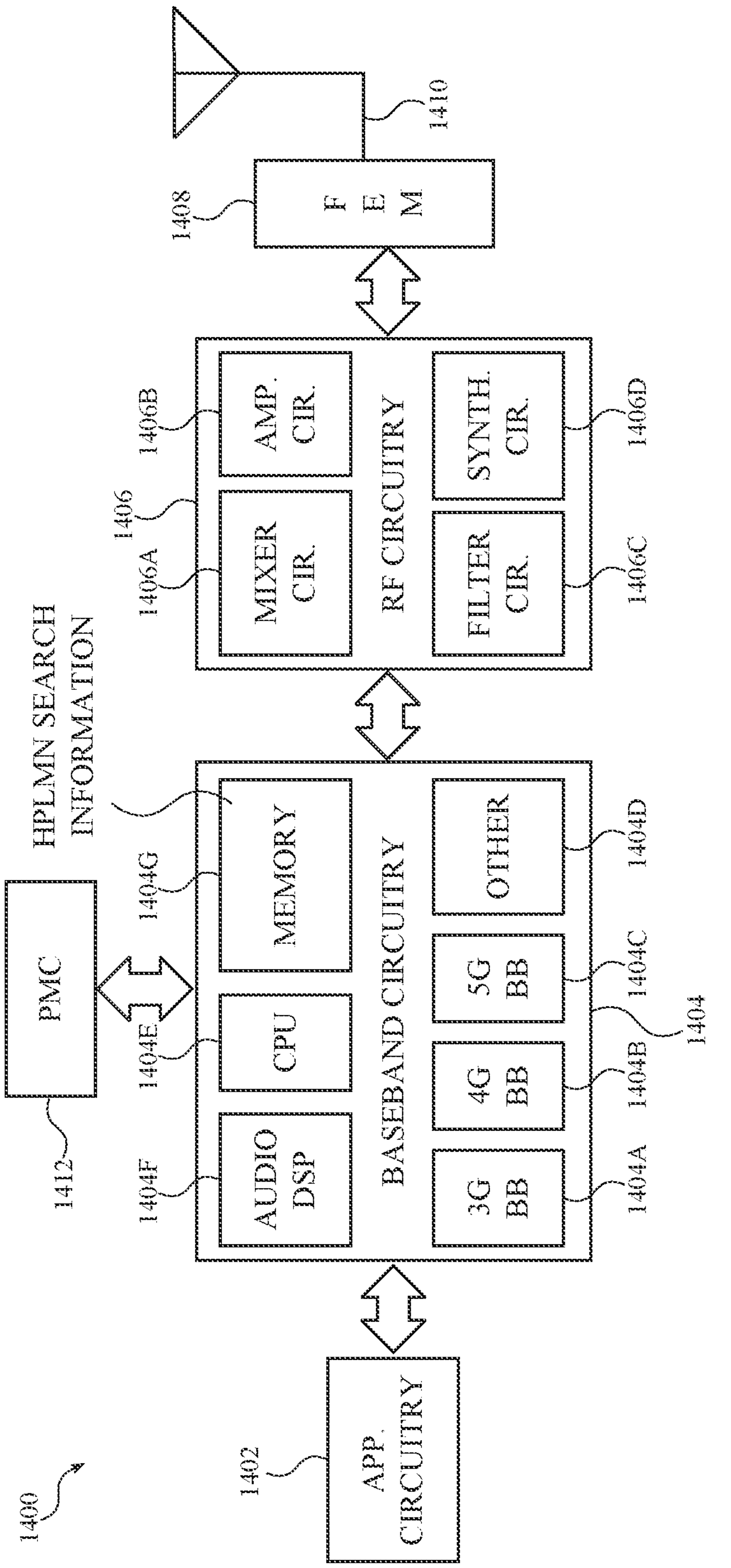
FIG. 14 is a diagram of an example of components of a device according to one or more implementations described herein.

FIG. 14 is a diagram of an example of components of a device according to one or more implementations described herein. In some implementations, the device 1400 can include application circuitry 1402, baseband circuitry 1404, RF circuitry 1406, front-end module (FEM) circuitry 1408, one or more antennas 1410, and power management circuitry (PMC) 1412 coupled together at least as shown. The components of the illustrated device 1400 can be included in a UE or a RAN node. In some implementations, the device 1400 can include fewer elements (e.g., a RAN node may not utilize application circuitry 1402, and instead include a processor/controller to process IP data received from a CN or an Evolved Packet Core (EPC)). In some implementations, the device 1400 can include additional elements such as, for example, memory/storage, display, camera, sensor (including one or more temperature sensors, such as a single temperature sensor, a plurality of temperature sensors at different locations in device 1400, etc.), or input/output (I/O) interface. In other implementations, the components described below can be included in more than one device (e.g., said circuitries can be separately included in more than one device for Cloud-RAN (C-RAN) implementations).

The application circuitry 1402 can include one or more application processors. For example, the application circuitry 1402 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1400. In some implementations, processors of application circuitry 1402 can process IP data packets received from an EPC.

The baseband circuitry 1404 can include circuitry such as, but not limited to, one or more single-core or multi-core processors. The baseband circuitry 1404 can include one or more baseband processors or control logic to process baseband signals received from a receive signal path of the RF circuitry 1406 and to generate baseband signals for a transmit signal path of the RF circuitry 1406. Baseband circuitry 1404 can interface with the application circuitry 1402 for generation and processing of the baseband signals and for controlling operations of the RF circuitry 1406. For example, in some implementations, the baseband circuitry 1404 can include a 3G baseband processor 1404A, a 4G baseband processor 1404B, a 5G baseband processor 1404C, or other baseband processor(s) 1404D for other existing generations, generations in development or to be developed in the future (e.g., 5G, 6G, etc.). The baseband circuitry 1404 (e.g., one or more of baseband processors 1404A-D) can handle various radio control functions that enable communication with one or more radio networks via the RF circuitry 1406. In other implementations, some or all of the functionality of baseband processors 1404A-D can be included in modules stored in the memory 1404G and executed via a Central Processing Unit (CPU) 1404E. The radio control functions can include, but are not limited to, signal modulation/demodulation, encoding/decoding, radio frequency shifting, etc. In some implementations, modulation/demodulation circuitry of the baseband circuitry 1404 can include Fast-Fourier Transform (FFT), preceding, or constellation mapping/de-mapping functionality. In some implementations, encoding/decoding circuitry of the baseband circuitry 1404 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, memory 1404G may store HPLMN search information. UE 210 with baseband circuitry 1404 may use the HPLMN search information to perform one or more operations described herein, such as determining a current tile of UE 210 and determining a number of HPLMN cells and/or HPLMN cell samples associated with the current tile. In some implementations, UE 210 may also use the HPLMN search information to determine an HPLMN search time based on a number of HPLMN cells and/or HPLMN cell samples.

In some implementations, the baseband circuitry 1404 can include one or more audio digital signal processor(s) (DSP) 1404F. The audio DSPs 1404F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1404 and the application circuitry 1402 can be implemented together such as, for example, on a system on a chip (SOC).

In some implementations, the baseband circuitry 1404 can provide for communication compatible with one or more radio technologies. For example, in some implementations, the baseband circuitry 1404 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1404 is configured to support radio communications of more than one wireless protocol can be referred to as multi-mode baseband circuitry.

RF circuitry 1406 can enable communication with wireless networks using modulated electromagnetic radiation through a non-solid medium. In various implementations, the RF circuitry 1406 can include switches, filters, amplifiers, etc. to facilitate the communication with the wireless network. RF circuitry 1406 can include a receive signal path which can include circuitry to down-convert RF signals received from the FEM circuitry 1408 and provide baseband signals to the baseband circuitry 1404. RF circuitry 1406 can also include a transmit signal path which can include circuitry to up-convert baseband signals provided by the baseband circuitry 1404 and provide RF output signals to the FEM circuitry 1408 for transmission.

In some implementations, the receive signal path of the RF circuitry 1406 can include mixer circuitry 1406A, amplifier circuitry 1406B and filter circuitry 1406C. In some implementations, the transmit signal path of the RF circuitry 1406 can include filter circuitry 1406C and mixer circuitry 1406A. RF circuitry 1406 can also include synthesizer circuitry 1406D for synthesizing a frequency for use by the mixer circuitry 1406A of the receive signal path and the transmit signal path. In some implementations, the mixer circuitry 1406A of the receive signal path can be configured to down-convert RF signals received from the FEM circuitry 1408 based on the synthesized frequency provided by synthesizer circuitry 1406D. The amplifier circuitry 1406B can be configured to amplify the down-converted signals and the filter circuitry 1406C can be a low-pass filter (LPF) or band-pass filter (BPF) configured to remove unwanted signals from the down-converted signals to generate output baseband signals. Output baseband signals can be provided to the baseband circuitry 1404 for further processing. In some implementations, the output baseband signals can be zero-frequency baseband signals, although this is not a requirement. In some implementations, mixer circuitry 1406A of the receive signal path can comprise passive mixers, although the scope of the implementations is not limited in this respect.

In some implementations, the mixer circuitry 1406A of the transmit signal path can be configured to up-convert input baseband signals based on the synthesized frequency provided by the synthesizer circuitry 1406D to generate RF output signals for the FEM circuitry 1408. The baseband signals can be provided by the baseband circuitry 1404 and can be filtered by filter circuitry 1406C.

In some implementations, the mixer circuitry 1406A of the receive signal path and the mixer circuitry 1406A of the transmit signal path can include two or more mixers and can be arranged for quadrature down conversion and up conversion, respectively. In some implementations, the mixer circuitry 1406A of the receive signal path and the mixer circuitry 1406A of the transmit signal path can include two or more mixers and can be arranged for image rejection (e.g., Hartley image rejection). In some implementations, the mixer circuitry 1406A of the receive signal path and the mixer circuitry' 1406A can be arranged for direct down conversion and direct up conversion, respectively. In some implementations, the mixer circuitry 1406A of the receive signal path and the mixer circuitry 1406A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 1406 can include analog-to-digital converter (ADC) and digital-to-analog converter (DAC) circuitry and the baseband circuitry 1404 can include a digital baseband interface to communicate with the RF circuitry 1406.

In some dual-mode implementations, a separate radio IC circuitry can be provided for processing signals for each spectrum, although the scope of the implementations is not limited in this respect.

In some implementations, the synthesizer circuitry 1406D can be a fractional-N synthesizer or a fractional N/N+1 synthesizer, although the scope of the implementations is not limited in this respect as other types of frequency synthesizers can be suitable. For example, synthesizer circuitry 1406D can be a delta-sigma synthesizer, a frequency multiplier, or a synthesizer comprising a phase-locked loop with a frequency divider.

The synthesizer circuitry 1406D can be configured to synthesize an output frequency for use by the mixer circuitry 1406A of the RF circuitry 1406 based on a frequency input and a divider control input. In some implementations, the synthesizer circuitry 1406D can be a fractional N/N+1 synthesizer.

In some implementations, frequency input can be provided by a voltage-controlled oscillator (VCO), although that is not a requirement. Divider control input can be provided by either the baseband circuitry 1404 or the applications circuitry 1402 depending on the desired output frequency. In some implementations, a divider control input (e.g., N) can be determined from a look-up table based on a cell indicated by the applications circuitry 1402.

Synthesizer circuitry 1406D of the RF circuitry 1406 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1406D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1406 can include an IQ/polar converter.

FEM circuitry 1408 can include a receive signal path which can include circuitry configured to operate on RF signals received from one or more antennas 1410, amplify the received signals and provide the amplified versions of the received signals to the RF circuitry 1406 for further processing. FEM circuitry 1408 can also include a transmit signal path which can include circuitry configured to amplify signals for transmission provided by the RF circuitry 1406 for transmission by one or more of the one or more antennas 1410. In various implementations, the amplification through the transmit or receive signal paths can be done solely in the RF circuitry 1406, solely in the FEM circuitry 1408, or in both the RF circuitry 1406 and the FEM circuitry 1408.

In some implementations, the FEM circuitry 1408 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1406). The transmit signal path of the FEM circuitry 1408 can include a power amplifier (PA) to amplify input RF signals (e.g., provided by RF circuitry 1406), and one or more filters to generate RF signals for subsequent transmission (e.g., by one or more of the one or more antennas 1410).

In some implementations, the PMC 1412 can manage power provided to the baseband circuitry 1404. In particular, the PMC 1412 can control power-source selection, voltage scaling, battery charging, or DC-to-DC conversion. The PMC 1412 can often be included when the device 1400 is capable of being powered by a battery, for example, when the device is included in a UE. The PMC 1412 can increase the power conversion efficiency while providing desirable implementation size and heat dissipation characteristics.

While FIG. 14 shows the PMC 1412 coupled only with the baseband circuitry 1404. However, in other implementations, the PMC 1412 may be additionally or alternatively coupled with, and perform similar power management operations for, other components such as, but not limited to, application circuitry 1402, RF circuitry 1406, or FEM circuitry 1408.

In some implementations, the PMC 1412 can control, or otherwise be part of, various power saving mechanisms of the device 1400. For example, if the device 1400 is in an RRC_Connected state, where it is still connected to the RAN node as it expects to receive traffic shortly, then it can enter a state known as Discontinuous Reception Mode (DRX) after a period of inactivity. During this state, the device 1400 can power down for brief intervals of time and thus save power.

If there is no data traffic activity for an extended period of time, then the device 1400 can transition off to an RRC_Idle state, where it disconnects from the network and does not perform operations such as cell quality feedback, handover, etc. The device 1400 goes into a very low power state and it performs paging where again it periodically wakes up to listen to the network and then powers down again. The device 1400 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 1402 and processors of the baseband circuitry 1404 can be used to execute elements of one or more instances of a protocol stack. For example, processors of the baseband circuitry 1404, alone or in combination, can be used execute Layer 3, Layer 2, or Layer 1 functionality, while processors of the baseband circuitry 1404 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 15:
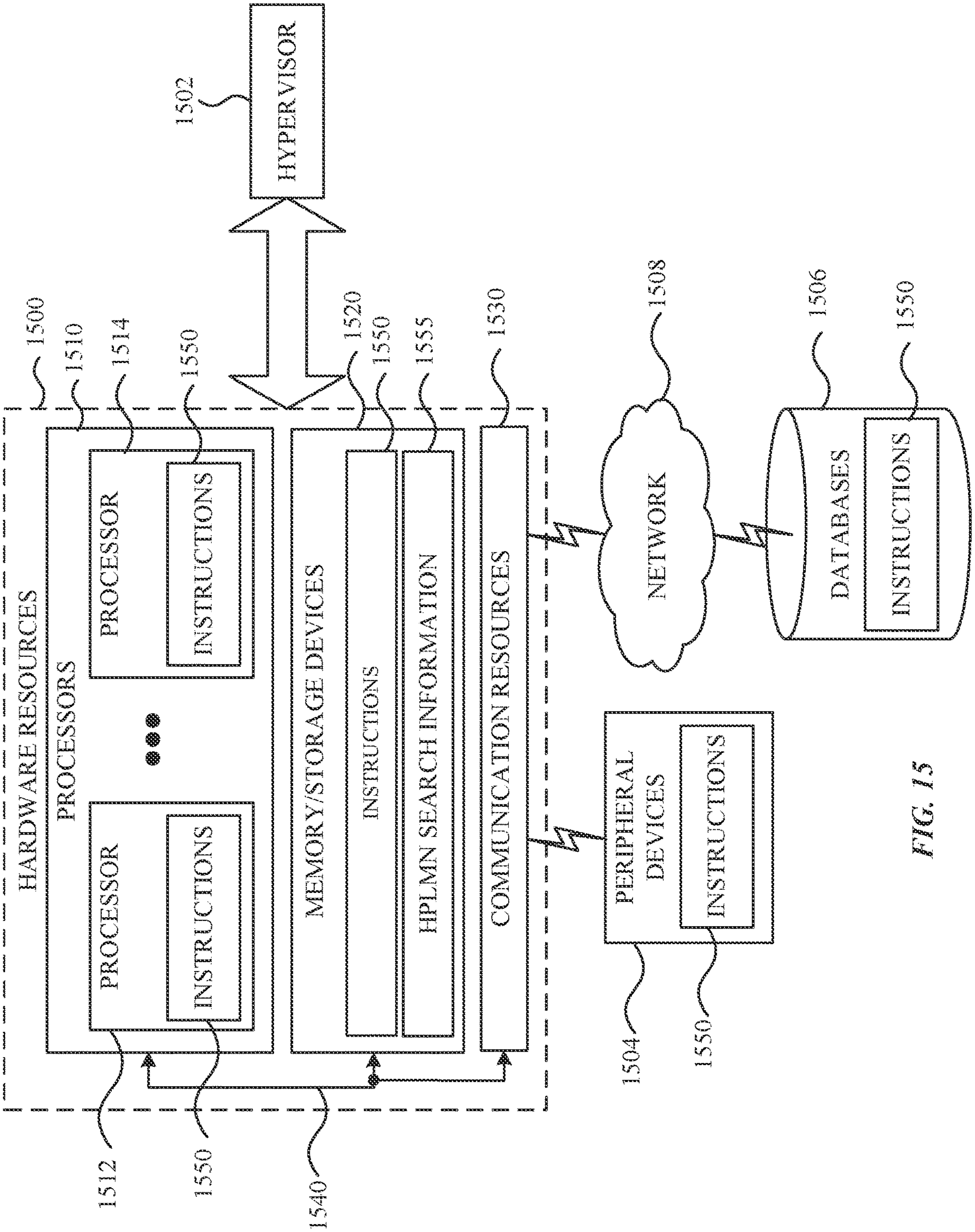
FIG. 15 is a block diagram illustrating components, according to one or more implementations described herein, able to read instructions from a machine-readable or computer-readable medium (e.g., a non-transitory machine-readable storage medium) and perform any one or more of the methodologies discussed herein.

FIG. 15 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which may be communicatively coupled via a bus 1540. For embodiments where node virtualization (e.g., NFV) is utilized, a hypervisor 1502 may be executed to provide an execution environment for one or more network slices/sub-slices to utilize the hardware resources 1500

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514.

The memory/storage devices 1520 may include main memory, disk storage, or any suitable combination thereof. The memory/storage devices 1520 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

In some implementations, memory/storage devices 1520 may store HPLMN search information 1555. UE 210 with processors 1514 may use the HPLMN search information 1555 to perform one or more operations described herein, such as determining a current tile of UE 210 and determining a number of HPLMN cells and/or HPLMN cell samples associated with the current tile. In some implementations, UE 210 may also use the HPLMN search information 1555 to determine an HPLMN search time based on a number of HPLMN cells and/or HPLMN cell samples.

The communication resources 1530 may include interconnection or network interface components or other suitable devices to communicate with one or more peripheral devices 1504 or one or more databases 1506 via a network 1508. For example, the communication resources 1530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 or the databases 1506. Accordingly, the memory of processors 1510, the memory/storage devices 1520, the peripheral devices 1504, and the databases 1506 are examples of computer-readable and machine-readable media.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the example described herein, a user equipment (UE), may comprise: a memory; and one or more processors configured to, when executing instructions stored in the memory, cause the UE to: determine a number of home public land mobile network (HPLMN) cells associated with a geographic location of the UE; determine, based on the number of HPLMN cells, an HPLMN search time; perform, upon expiration of the HPLMN search time, a search for HPLMN cells; and connect to an HPLMN cell when the HPLMN cell is detected.

In example 2, which may also include one or more of the example described herein, wherein the UE is connected to a visited public land mobile network (VPLMN) prior to connecting to the HPLMN.

In example 3, which may also include one or more of the example described herein, wherein the UE remains connected to the VPLMN when no HPLMN cell is detected.

In example 4, which may also include one or more of the example described herein, wherein the one or more processors is further configured to: determine the geographic location of the UE in terms of a tile associated with a grid In example 5, which may also include one or more of the example described herein, wherein the one or more processors is further configured to: determine a number of HPLMN cell samples associated with the geographic location; and determine the HPLMN search time based on the number of HPLMN cells and the number of HPLMN cell samples.

In example 6, which may also include one or more of the example described herein, wherein the HPLMN search time is determined by comparing the number of HPLMN cells to one or more thresholds of HPLMN cells.

In example 7, which may also include one or more of the example described herein, wherein the one or more processors is further configured to: modify the one or more thresholds of HPLMN cells based on an HPLMN cell type of the HPLMN cells associated with the geographic location of the UE.

In example 8, which may also include one or more of the example described herein, wherein the HPLMN search time comprises one HPLMN search time of a plurality of pre-determined HPLMN search times.

In example 9, which may also include one or more of the example described herein, wherein the one or more processors is further configured to: modify one or more HPLMN search times, of the plurality of pre-determined HPLMN search times, based on a mobility status of the UE.

In example 10, which may also include one or more of the example described herein a method performed by a user equipment (UE) may comprise: determining a number of home public land mobile network (HPLMN) cells associated with a geographic location of the UE; determining, based on the number of HPLMN cells, an HPLMN search time; performing, upon expiration of the HPLMN search time, a search for HPLMN cells; and connecting to an HPLMN cell when the HPLMN cell is detected.

In example 11, which may also include one or more of the example described herein, a non-transitory, computer-readable medium, may comprise: instructions configured to cause one or more processors to: determine a number of home public land mobile network (HPLMN) cells associated with a geographic location of a user equipment (UE); determine, based on the number of HPLMN cells, an HPLMN search time; perform, upon expiration of the HPLMN search time, a search for HPLMN cells; and connect to an HPLMN cell when the HPLMN cell is detected.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising:
- a memory; and
- one or more processors configured to, when executing instructions stored in the memory, cause the UE to:
  - determine a number of home public land mobile network (HPLMN) cells associated with a geographic location of the UE;
  - determine a number of HPLMN cell samples associated with the geographic location;

determine, based on the number of HPLMN cells and the number of HPLMN cell samples, an HPLMN search time;

perform, upon expiration of the HPLMN search time, a search for HPLMN cells; and connect to an HPLMN cell when the HPLMN cell is detected.

2. The UE of claim 1, wherein the UE is connected to a visited public land mobile network (VPLMN) prior to connecting to the HPLMN.

3. The UE of claim 2, wherein the UE remains connected to the VPLMN when no HPLMN cell is detected.

4. The UE of claim 1, wherein the one or more processors is further configured to: determine the geographic location of the UE in terms of a tile associated with a grid.

5. The UE of claim 1, wherein the HPLMN search time is determined by comparing the number of HPLMN cells to one or more thresholds of HPLMN cells.

6. The UE of claim 5, wherein the one or more processors is further configured to:

modify the one or more thresholds of HPLMN cells based on an HPLMN cell type of the HPLMN cells associated with the geographic location of the UE.

7. The UE of claim 1, wherein the HPLMN search time comprises one HPLMN search time of a plurality of pre-determined HPLMN search times.

8. The UE of claim 7, wherein the one or more processors is further configured to:

modify one or more HPLMN search times, of the plurality of pre-determined HPLMN search times, based on a mobility status of the UE.

9. A method for a user equipment (UE), the method comprising:

determining a number of home public land mobile network (HPLMN) cells associated with a geographic location of the UE;

modifying one or more thresholds of HPLMN cells based on an HPLMN cell type of the HPLMN cells associated with the geographic location of the UE;

determining an HPLMN search time by comparing the number of HPLMN cells to the one or more modified thresholds of HPLMN cells;

performing, upon expiration of the HPLMN search time, a search for HPLMN cells; and connecting to an HPLMN cell when the HPLMN cell is detected.

10. The method of claim 9, wherein the UE is connected to a visited public land mobile network (VPLMN) prior to connecting to the HPLMN.

11. The method of claim 10, wherein the UE remains connected to the VPLMN when no HPLMN cell is detected.

12. The method of claim 9, further comprising:

determining the geographic location of the UE in terms of a tile associated with a grid.

13. The method of claim 9, further comprising:

determining a number of HPLMN cell samples associated with the geographic location; and determining the HPLMN search time based on the number of HPLMN cells and the number of HPLMN cell samples.

14. A non-transitory computer-readable medium comprising instructions, that when executed by one or more processors, cause the one or more processors to:

determine a mobility state of a user equipment (UE), including determining whether the UE is moving faster than a threshold rate;

modify one or more home public land mobile network (HPLMN) search times of a plurality of pre-determined HPLMN search times based on the mobility state of the UE;

determine a number of HPLMN cells associated with a geographic location of the UE;

determine, based on the number of HPLMN cells, an HPLMN search time from the plurality of pre-determined HPLMN search times;

perform, upon expiration of the HPLMN search time, a search for HPLMN cells; and connect to an HPLMN cell when the HPLMN cell is detected.

15. The non-transitory computer-readable medium of claim 14, wherein the UE is connected to a visited public land mobile network (VPLMN) prior to connecting to the HPLMN.

16. The non-transitory computer-readable medium of claim 15, wherein the UE remains connected to the VPLMN when no HPLMN cell is detected.

17. The non-transitory computer-readable medium of claim 14, wherein the instructions further cause the one or more processors to:

determine the geographic location of the UE in terms of a tile associated with a grid.

18. The non-transitory computer-readable medium of claim 14, wherein the instructions further cause the one or more processors to:

determine a number of HPLMN cell samples associated with the geographic location; and determine the HPLMN search time based on the number of HPLMN cells and the number of HPLMN cell samples.

19. The non-transitory computer-readable medium of claim 14, wherein the HPLMN search time is determined by comparing the number of HPLMN cells to one or more thresholds of HPLMN cells.

20. The non-transitory computer-readable medium of claim 19, wherein the instructions further cause the one or more processors to:

modify the one or more thresholds of HPLMN cells based on an HPLMN cell type of the HPLMN cells associated with the geographic location of the UE.

* * * * *